United States Patent
Oki et al.

(10) Patent No.: US 7,978,713 B2
(45) Date of Patent: Jul. 12, 2011

(54) GMPLS+IP/MPLS NODE AND IP/MPLS NODE

(75) Inventors: Eiji Oki, Tokyo (JP); Daisaku Shimazaki, Tokorozawa (JP); Kohei Shiomoto, Iruma (JP); Naoaki Yamanaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1002 days.

(21) Appl. No.: 10/533,397

(22) PCT Filed: Mar. 24, 2004

(86) PCT No.: PCT/JP2004/004086
§ 371 (c)(1),
(2), (4) Date: Apr. 26, 2005

(87) PCT Pub. No.: WO2004/086704
PCT Pub. Date: Oct. 7, 2004

(65) Prior Publication Data
US 2006/0018313 A1   Jan. 26, 2006

(30) Foreign Application Priority Data

Mar. 26, 2003 (JP) ................................. 2003-085423
Aug. 20, 2003 (JP) ................................. 2003-296440
Mar. 1, 2004 (JP) ................................. 2004-056129

(51) Int. Cl.
*H04L 12/28* (2006.01)
(52) U.S. Cl. ..................... 370/401; 370/230; 370/465
(58) Field of Classification Search .................... None
See application file for complete search history.

(56) References Cited

U.S. PATENT DOCUMENTS

| | | | |
|---|---|---|---|
| 2003/0067880 A1* | 4/2003 | Chiruvolu | 370/237 |
| 2003/0147645 A1* | 8/2003 | Imajuku et al. | 398/7 |
| 2003/0161633 A1* | 8/2003 | Oki et al. | 398/57 |
| 2003/0189933 A1* | 10/2003 | Ozugur et al. | 370/395.1 |
| 2004/0015583 A1* | 1/2004 | Barrett et al. | 709/224 |
| 2004/0062195 A1* | 4/2004 | Mishra et al. | 370/217 |
| 2004/0076151 A1* | 4/2004 | Fant et al. | 370/389 |
| 2004/0114595 A1* | 6/2004 | Doukai | 370/389 |

(Continued)

FOREIGN PATENT DOCUMENTS

JP    2004-146915 A    5/2004

OTHER PUBLICATIONS

Banerjee, Ayan, Generalized Multiprotocol Label Switching: An Overview of Routing and Management Enhancements.*

(Continued)

*Primary Examiner* — Daniel J Ryman
*Assistant Examiner* — Tito Pham
(74) *Attorney, Agent, or Firm* — Harness, Dickey & Pierce, P.L.C.

(57) ABSTRACT

A network is realized having GMPLS and IP/MPLS mixed, in which an IP/MPLS node can be operated as is without replacing the IP/MPLS node with a node having a GMPLS function, even if the GMPLS and IP/MPLS are mixed. To match with the protocol of the IP/MPLS node outside of a GMPLS cloud, the GMPLS+IP/MPLS node (edge) establishes a PSC-LSP between GMPLS+IP/MPLS nodes (edge), uses the PSC-LSP as an IP/MPLS link from the viewpoint of the IP/MPLS node, and operates signaling of an MPLS-LSP establishment requested from the IP/MPLS.

30 Claims, 27 Drawing Sheets

U.S. PATENT DOCUMENTS

| | | | |
|---|---|---|---|
| 2004/0136389 A1* | 7/2004 | Hunneyball | 370/406 |
| 2004/0203827 A1* | 10/2004 | Heiner et al. | 455/452.1 |
| 2004/0228331 A1* | 11/2004 | Hansen et al. | 370/352 |
| 2005/0180431 A1* | 8/2005 | Kinoshita et al. | 370/397 |

OTHER PUBLICATIONS

Banerjee, Ayan, Generalized Multiprotocol Label Switching: An Overview of Signaling Enhancements and Recovery Techniques.*

Hang Liu, "GMPLS-Based Control Plane for Optical Networks: Early Implementation Experience," 2002, SPIE vol. 4872 pp. 220-229.*

Okamoto et al., GMPLS-Based Photonic Multi-layer Router (Hikari Router) Architecture: An Overview of Traffic Engineer and Signaling Technology, Nov. 2002, IEEE Communication Magazine, vol. 40 issue 11, p. 52-59.*

Sato et al., Demonstration of the High Reliable HIKARI router Network based on a Newly Develeoped Disjoint Path Seelction Scheme, Mar. 2002, IEEE Communication Magazine, vol. 4 issue 3, p. 96-101.*

Kohei Shiomoto, "Photonic IP Network Architecture ni Kansuru Kento", Shingaku Giho NS2001-191, Dec. 17, 2001 (English Abstract).

Hideharu Oki, "GMPLS Network ni okeru Multi Layer Routing", 2002 Nen The Institute of Electronics, Information and Communication Engineers Society Taikai SB-11-1, Sep. 13, 2002.

E. Rosen, A. Viswanathan, and R. Callon, "Multiprotocol Label Switching Architecture", RFC 3031, pp. 1-61, Jan. 2001.

J. Moy, "OSPF Version 2", IETF RFC 2328, pp. 1-244, Apr. 1998.

R. Coltun, "The OSPF Opaque LSA Option", RFC 2370, pp. 1-15, Jul. 1998.

K. Kompella and Y. Rekhter, "OSPF Extension in Support of Generalized MPLS", IETF draft, draft-ietf-ccamp-ospf-gmpls-extenstions-09.txt, pp. 1-13, Dec. 2002.

P. Ashwood-Smith et al., "Generalized MPLS Signaling-RSVP-TE Extensions", IETF draft, draft-ietf-mpls-generalized-rsvp-te-09.txt, Aug. 2002 (August version unavailable, September version enclosed).

D. Awduche et al., "RSVP-TE: Extensions to RSVP for LSP Tunnels":, RFC 3209, pp. 1-61, Dec. 2001.

A. Banerjee et al, "Generalized Multiprotocol Label Switching: An Overview of Routing and Management Enhancements", IEEE Communication Magazine, pp. 144-150, Jan. 2001.

D. Katz et al., "Traffic Engineering Extensions to OSPF Version 2", IETF draft, draft-katz-yeung-ospf-traffic-10.txt, pp. 1-15, Jun. 2003.

K. Kompella and Y. Rekhter, "Routing Extensions in Support of Generalized Multi-Protocol Label Switching", draft-ietf-ccamp-gmpls-routing-09.txt, pp. 1-25, Oct. 2003.

E. Mannie et al., "Generalized Multi-Protocol Label Switching Architecture", draft-ietf-ccamp-gmpls-architecture-07.txt, pp. 1-58, May 2003.

F. LeFaucheur et al., "Multi-Protocol Label Switching (MPLS) Support of Differentiated Services", RFC 3270, pp. 1-64, May 2002.

L. Berger et al., "Generalized Multi-Protocol Label Switching (GMPLS) Signaling Functional Description", RFC 3471, pp. 1-34, Jan. 2003.

A. Banerjee et al., "Generalized Multiprotocol Label Switching: An Overview of Signaling Enhancements and Recovery Techniques", IEEE Communications Magazine, pp. 144-151, Jul. 2001.

D. Shimazaki et al., "GMPLS network and IP network/MPLS network Interworking", Technical Report of IEICE (The Institute of Electronics Information and Communication Engineers), PN2003-4 (Sep. 2003), pp. 15-20 (English Abstract).

D. Shimazaki et al., "MPLS+GMPLS Multi-Region Network Interoperability Test", Technical Report of IEICE (The Institute of Electronics, Information and Communication Engineers), NS2003-203, PN2003-31 (Dec. 2003) pp. 35-40 (English Abstract).

E. Oki et al., "GMPLS and IP/MPLS Internetworking Network Architecture", The Institute of Electronics, Information and Communication Engineers, Communication Society, B-8-21, p. 299, 2003.

D. Shimazaki et al., "GMPLS and IP/MPLS Internetworking Experiment", The Institute of Electronics, Information and Communication Engineers, Communication Society, B-8-22, p. 300, 2003.

K. Kompella and Y. Rekhter, "OSPF Extension in Support of Generalized MPLS", IETF draft, draft-ietf-ccamp-ospf-gmpls-extensions-12.txt, pp. 1-12, Oct. 2003.

D. Katz et al., "Traffic Enginering (TE) Extensions to OSPF Version 2", RFC 3630, pp. 1-14, Sep. 2003.

L. Berger et al., "Generalized Multi-Protocol Label Switching (GMPLS) Signaling Resourse ReserVation Protocol-Traffic Engineering (RSVP-TE) Extensions", RFC 3473, pp. 1-42, Jan. 2003.

Liu, Hang, et al., "GMPLS-Based Control Plane for Optical Networks: Early Implementation Experience," Proceedings of SPIE, The Engineering Society for Optical Engineering, Jul. 29, 2002, pp. 220-229, vol. 4872.

Kompella, K., et al., editors, "Routing Extensions in Support of Generalized MPLS; draft-ietf-ccamp-gmpls-routing-05.txt," IETF Standard-Working-Draft, Internet Engineering Task Force, Aug. 1, 2002, pp. 1-24, vol. ccamp, No. 5.

\* cited by examiner

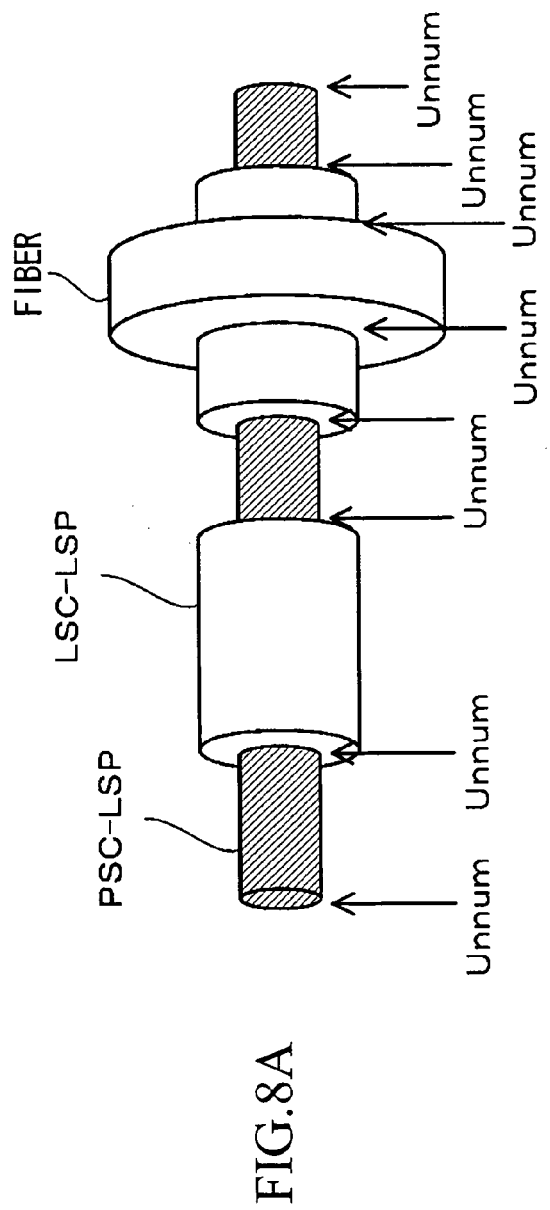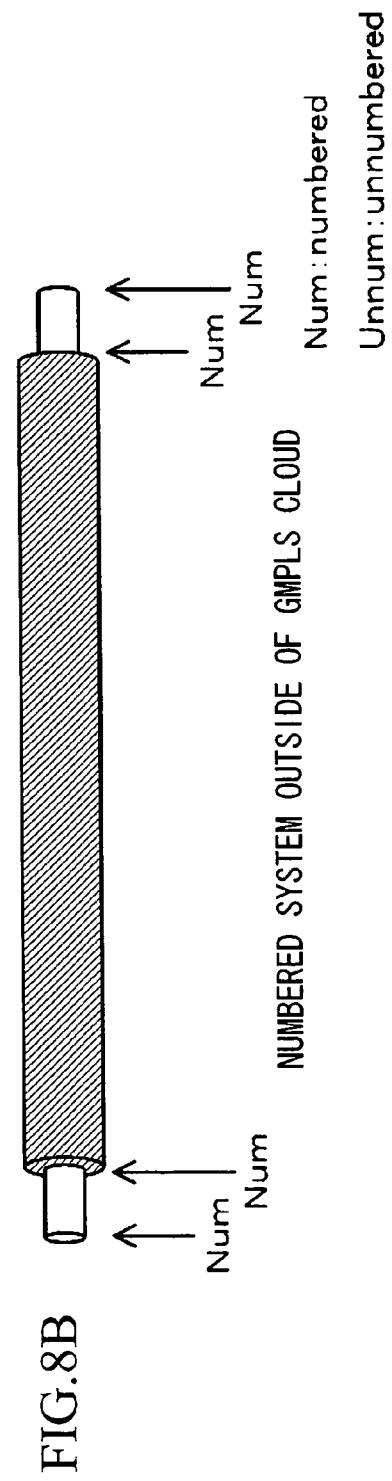
FIG. 8A
FIG. 8B

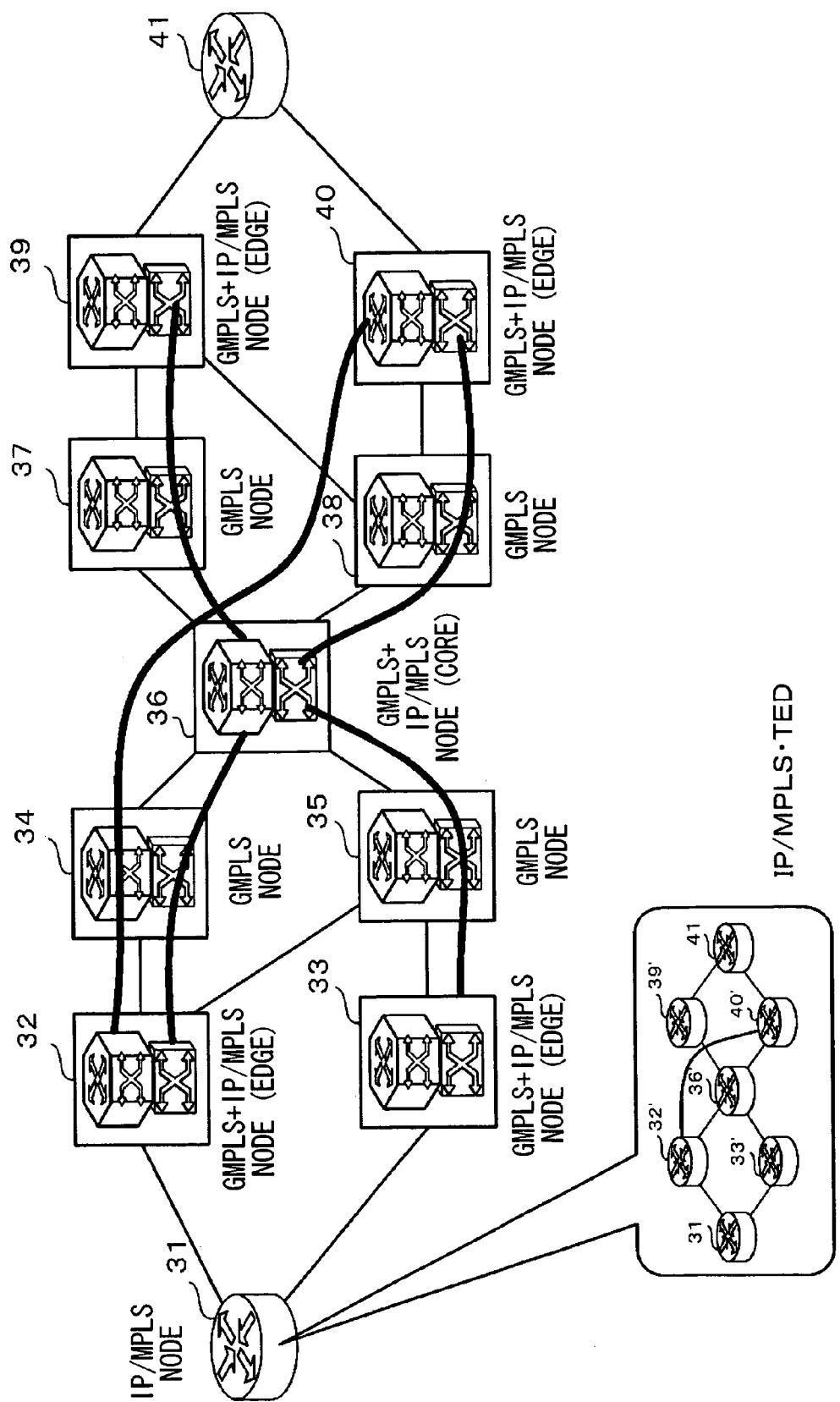

FIG.16

| GMPLS | | | MPLS | | |
|---|---|---|---|---|---|
| ITEM | | VALUE | ITEM | | VALUE |
| LINK TYPE | 1 | POINT-TO-POINT | TYPE | 1 | POINT-TO-POINT |
| | 2 | MULTIACCESS | | 2 | CONNECTION TO A TRANSIT NETWORK |
| LINK ID | 1 | NEIGHBORING ROUTER'S ROUTER ID | LINK ID | 1 | NEIGHBORING ROUTER'S ROUTER ID |
| | 2 | DR'S INTERFACE ADDRESS | | 2 | IP ADDRESS OF DESIGNATED ROUTER |
| LOCAL INTERFACE IP ADDRESS (IN CASE OF NUMBERED SYSTEM) | | | LINK DATA | 1 | ROUTER INTERFACE'S IP ADDRESS |
| LINK LOCAL IDENTIFIERS (IN CASE OF UNNUMBERED SYSTEM) | | | | 1 | IFINDEX VALUE |

PACKET

TDM $\lambda$

FIBER

GMPLS+IP/MPLS NODE AND IP/MPLS NODE

TECHNICAL FIELD

The present invention relates to a connection scheme between networks using different switching schemes. In other words, the present invention relates to a connection scheme between networks managed by different methods. Particularly, the present invention relates to a network where GMPLS (Generalized Multi-Protocol Label Switching) networks and IP/MPLS (Internet Protocol/Multi-Protocol Label Switching) networks are mixed.

Priority is claimed on Japanese Patent Application No. 2003-85423 filed Mar. 26, 2003, Japanese Patent Application No. 2003-296440 filed Aug. 20, 2003, and Japanese Patent Application No. 2004-56129 filed Mar. 1, 2004, the contents of which are incorporated herein by reference.

BACKGROUND ART

Hereunder is a list of documents referred to in the present description.
Non Patent Document 1: E. Rosen, A. Viswanathan, and R. Callon, "Multiprotocol Label Switching Architecture", RFC 3031.
Non Patent Document 2: J. Moy, "OSPF Version 2", RFC 2328.
Non Patent Document 3: R. Coltun, "The OSPF Opaque LSA Option", RFC 2370.
Non Patent Document 4: K. Kompella and Y. Rekhter, "OSPF Extension in Support of Generalized MPLS", IETF draft, draft-ietf-ccamp-ospf-gmpls-extensions-09.txt, December 2002.
Non Patent Document 5: P. Ashwood-Smith et al, "Generalized MPLS Signaling-RSVP-TE Extensions", IETF draft, draft-ietf-mpls-generalized-rsvp-te-09.txt, August 2002.
Non Patent Document 6: D. Awduche et al., "RSVP-TE: Extensions to RSVP for LSP Tunnels", RFC 3209, December 2001.
Non Patent Document 7: A. Banerjee et al, "Generalized Multiprotocol Label Switching: An Overview of Routing and Management Enhancements", IEEE Commun. Mag., pp. 144-150, January 2001.
Non Patent Document 8: D. katz et al., "Traffic Engineering Extensions to OSPF Version 2", IETF draft, draft-katz-yeung-ospf-traffic-10.txt, June 2003.

A conventional network comprising IP/MPLS nodes is shown in FIG. 21. In the network within the IP/MPLS, the switching capability of the node interface is all PSC (Packet Switching Capable). MPLS architecture is defined in order to support data transfer based on labels (for example, refer to Non Patent Document 1). In RFC3031, an LSR (Label Switching Router) means a node which has a data transfer plane which can identify the border of an IP packet or a cell (labeled IP packet), and which performs data transfer processing according to the contents of the IP packet header or cell header. In GMPLS, the LSR is not only the node that performs data transfer processing according to the contents of the IP packet header or cell header. The LSR in GMPLS includes a device which performs transfer processing based on the information of a time slot, a wavelength, or a physical port of a file.

On the other hand, the LSR interface in GMPLS is classified into four by switching capability, namely: PSC (Packet Switch Capable), TDM (Time-Division Multiplex Capable), LSC (Lambda Switch Capable) and FSC (Fiber Switch Capable). Moreover, the concept of labels in GMPLS is shown in FIG. 22A to FIG. 22D.

(Description of PSC)

A PSC interface can identify the border of an IP packet or a cell, and performs data transfer processing according to the contents of the IP packet header or cell header. In FIG. 22A, in the packet layer, a label uniquely defined by each link is defined, and the label is given to the IP packet to form an LSP (Label Switch Path). The link in FIG. 22A is a link which is defined between LSRs in order to transfer the IP packet. If transferring the IP packet on SDH/SONET, it becomes a SDH/SONET path. If transferring on Ethernet (registered trademark), it becomes an Ethernet (registered trademark).

(Description of TDM)

The TDM interface performs data transfer processing based on a periodically repeated time slot. In FIG. 22B, in the TDM layer, the label becomes the time slot. An example of a TDM interface is a DXC (data cross-connect) interface, which connects the time slot allocated on the input side and the time slot allocated on the output side, to form a TDM path, that is a SDH/SONET path. The link may be a wavelength path in some cases, or may simply be a fiber in other cases.

(Description of LSC)

An LSC interface performs data transmission processing based on the wavelength in the fiber used for transferring the data. In FIG. 22C, in the Lambda layer, the label becomes the wavelength. An example of an LSC interface is an OXC (optical cross-connect) interface, which connects the wavelength allocated on the input side and the wavelength allocated on the output side to form a Lambda path. An OXC interface having LSC performs switching in wavelength units.

(Description of FSC)

An FSC interface performs data transmission processing based on the position of an actual physical port of a fiber used for transferring the data. In FIG. 22D, in the fiber layer, the label becomes the fiber. An example of an FSC interface is an OXC interface, which connects the input side fiber and the output side fiber to form a fiber path. The OXC interface having FSC performs switching in fiber units. The link means the physical aggregate of fibers, including conduits, etc.

The above interfaces of switching capability can be hierarchized for use. For example, FSC, LSC, TDM and PSC in sequential order from the upper hierarchy. In GMPLS, the path with respect to the respective switching capability mentioned above is also called LSP. FIG. 23 shows the hierarchical structure of LSP. PSC-LSP belongs to TDM-LSP, and the PSC-LSP link becomes TDM-LSP. TDM-LSP belongs to LSC-LSP, and the TDM-LSP link becomes LSC-LSP. LSC-LSP becomes FSC-LSP and the LSC-LSP link becomes FSC-LSP. Moreover, considering a case where the TDM layer is omitted, PSC-LSP belongs to LSC-LSP, and the PSC-LSP link becomes LSC-LSP. The relation of LSC-LSP and FSC-LSP is similar to that of FIG. 22B. As the layer becomes lower, the LSP band becomes broader.

In such conventional techniques, for example as shown in FIG. 24, if GMPLS nodes 2, 3, 4, 5, and 6 being GMPLS nodes having PSC switching capability and LSC switching capability, and IP/MPLS nodes 1 and 7 having only the PSC function are mixed, the IP/MPLS nodes are not matched with GMPLS protocol. Therefore, as shown in FIG. 25 in the conventional technique, all nodes have to be replaced by GMPLS nodes which are operated by GMPLS protocol in order to match the IP/MPLS nodes having only PSC function with GMPLS protocol. Accordingly, the installation cost becomes higher for installing the GMPLS nodes.

In GMPLS, there are routing protocols and signaling protocols for GMPLS with the extended IP/MPLS. In the routing protocol for GMPLS, GMPLS regards LSPs in all hierarchies as the link from the viewpoint of the upper layer, and advertise the link state. Accordingly, the nodes in the GMPLS network hold all link states, and have the topologies of the respective layers. A database of the topologies is made for traffic engineering, and is called a GMPLS-TED (Traffic Engineering Database). The respective nodes hold the GMPLS-TED.

In the signaling protocol, there are signaling protocols for GMPLS, and all GMPLS nodes are required to operate the signaling protocol for GMPLS. FIGS. 26A and 26B show how LSC-LSPs are established on the hierarchy of PSC-LSP. The LSC-LSP is established between node 2 and node 4. The LSC-LSP is established between node 4 and node 5. The PSC-LSP is established through the two LSC-LSPs between node 21 and node 27.

FIG. 27 shows the structure of a conventional GMPLS node. As shown in FIG. 27, the conventional GMPLS node comprises; a GMPLS signaling unit 10 which controls the signaling of GMPLS, a GMPLS routing unit 11 which controls the routing of GMPLS, a GMPLS-TED unit 14 which stores the link state information of the GMPLS network, a control unit controller 20 which controls the respective units, and a switch unit 19 which performs packet switching.

DISCLOSURE OF INVENTION

The present invention is based on such background, with an object of providing a network having GMPLS and IP/MPLS mixed, in which an IP/MPLS node can be operated as is without replacing the IP/MPLS node with the GMPLS node, even if the GMPLS node and IP/MPLS node are mixed.

In the present invention, it is not necessary to replace all nodes with GMPLS. The node which was originally the IP/MPLS node can be used as the IP/MPLS as is.

A GMPLS cloud which is composed of only nodes having GMPLS functions is constructed. A node in the GMPLS cloud which is connected to the IP/MPLS node by a physical link is called an edge node. As this edge node, there is arranged a GMPLS+IP/MPLS node which can process the GMPLS protocol and the IP/MPLS protocol (hereunder, GMPLS+IP/MPLS node (edge)). Moreover, a node except for the GMPLS+IP/MPLS node (edge) being the node having the GMPLS function in the GMPLS cloud is called a core node. As the core node, there is arranged either one of the GMPLS+IP/MPLS node or the GMPLS node. The GMPLS+IP/MPLS node as the core node is denoted by GMPLS+IP/MPLS node (core). The GMPLS node as the core node is denoted by GMPLS node (core).

The GMPLS+IP/MPLS node (edge) supports the following functions so as to match with the protocol of the IP/MPLS node outside of the GMPLS cloud. The PSC-LSP is established between the GMPLS+IP/MPLS nodes (edge). The PSC-LSP is used as the IP/MPLS link from the aspect of IP/MPLS node. The signaling of MPLS-LSP establishment requested from the IP/MPLS is operated. The GMPLS+IP/MPLS node (edge) has the GMPLS-TED and the IP/MPLS-TED. The IP/MPLS node has the IP/MPLS-TED. The GMPLS+IP/MPLS node (core) or the GMPLS node (core) has the GMPLS-TED.

Accordingly, the IP/MPLS node can be operated in a network having GMPLS mixed, in a similar way to that of a network having IP/MPLS only, without operating the GMPLS protocol.

That is, a first aspect of the present invention is a GMPLS+IP/MPLS node which is used in a network in which a GMPLS network and an IP network are mixed, the GMPLS network comprising a node having a GMPLS function, the IP network comprising an IP/MPLS (Internet Protocol/Multi Protocol Label Switching) node, and which constitutes the GMPLS network, and which processes a GMPLS protocol and an IP/MPLS protocol, the GMPLS+IP/MPLS node.

Here, the present invention comprises: a device which establishes a GMPLS label path of a packet layer with another GMPLS+IP/MPLS node in the GMPLS network; and a device which tunnel transfers a packet transferred from the IP/MPLS node with the other GMPLS+IP/MPLS node through the GMPLS label path.

Therefore, viewing from the IP/MPLS node, the GMPLS label path of the packet layer established in the GMPLS network looks like a label path in the IP/MPLS network. Accordingly, a network having the IP/MPLS and the GMPLS mixed can be configured.

There may be provided a device which advertises link state information of the GMPLS label path of the packet layer to the IP/MPLS node by a router LSA (Label Switching Advertisement) as a normal link in the IP/MPLS node.

Therefore, the link state information of the GMPLS label path of the packet layer in the GMPLS network can be advertised in a form acceptable by the IP/MPLS node.

There may be provided: a device which holds the link state information having the GMPLS label path of the packet layer advertised as the link; and a device which holds link state information inside of the GMPLS network.

Therefore, the link state information of both the GMPLS network and the IP/MPLS network can be held to deal with both networks.

There may be provided a device which converts a link of PSC-LSP (Packet Switch Capable-Label Switch Path) used for IP/MPLS from an unnumbered system into a numbered system to advertise as the link of the numbered system. Alternatively, there may be provided a device which advertises the GMPLS label switch path of the packet layer as a link of a numbered system.

Therefore, the link state information of the GMPLS label path of the packet layer in the GMPLS network can be advertised in a form acceptable by the IP/MPLS node.

There may be provided: a device which performs processing inside of the GMPLS network in accordance with an unnumbered system; and a device which converts a link of PSC-LSP used for IP/MPLS from the unnumbered system into a numbered system to advertise as the link of the numbered system. Alternatively, there may be provided: a device which performs processing inside of the GMPLS network in accordance with an unnumbered system; and a device which converts the GMPLS label switch path of the packet layer from the unnumbered system into a numbered system to advertise as the link of the numbered system.

Therefore, convenient processes may be respectively performed in the GMPLS network and the IP/MPLS network.

In such a numbered system, there may be provided: a device which previously stores an IP address; and a device which uses the stored IP address as an IP address of the link of the numbered system.

There may be provided an LSA converting device which converts an Opaque LSA expressing a D-plane label path in the GMPLS network into a router LSA, wherein when the label path is a point-to-point Link type of a numbered system, the LSA converting device may change a Link-State Advertisement Type to 1 corresponding to the router LSA, copy an Advertising Router value and an LS Sequence number value, copy a Link ID field value in the Opaque LSA to a Link ID field of the router LSA, and copy a Local interface IP address field value in the Opaque LSA to a Link Data field of the router LSA expressing a router interface's IP address.

Therefore, it becomes possible to generate a router LSA which plays a role of advertising the GMPLS label path to the MPLS network.

There may be provided an LSA converting device which converts an Opaque LSA expressing a D-plane label path in the GMPLS network into a router LSA, wherein when the label path is a point-to-point Link type of an unnumbered system, the LSA converting device may change a Link-State Advertisement Type to 1 corresponding to the router LSA, copy an Advertising Router value and an LS Sequence number value, copy a Link ID field value in the Opaque LSA to a Link ID field of the router LSA, and copy a Link Local Identifiers field value in the Opaque LSA to a Link Data field of the router LSA expressing an ifIndex value.

Therefore, it becomes possible to generate a router LSA which plays a role of advertising the GMPLS label path to the MPLS network.

There may be provided an LSA converting device which converts an Opaque LSA expressing a D-plane label path in the GMPLS network into a router LSA, wherein when the label path is a multi-access Link type, the LSA converting device may change a Link-State Advertisement Type to 1 corresponding to the router LSA, copy an Advertising Router value and an LS Sequence number value, copy a Link ID field value in the Opaque LSA to a Link ID field of the router LSA, and copy a Local interface IP address field value in the Opaque LSA to a Link Data field of the router LSA expressing a router interface's IP address.

Therefore, it becomes possible to generate a router LSA which plays a role of advertising the GMPLS label path to the MPLS network.

There may be provided: an LSA identifying device which receives a router LSA generated by another GMPLS+IP/MPLS node and identifies whether the router LSA advertises a C-plane of the GMPLS network, or whether the router LSA is obtained by converting an Opaque LSA expressing the GMPLS label path; and a link state holding device which holds link state information of the GMPLS network, wherein the LSA identifying device may search the link state holding device of the GMPLS+IP/MPLS node itself using an Advertising Router value and an LS Sequence number value included in the received router LSA as a key, and when link state information having the same Advertising Router and LS Sequence number as the received router LSA is held in the link state holding device, the LSA identifying device may judge that the received router LSA is obtained by converting the Opaque LSA expressing the GMPLS label path.

Therefore, it becomes possible to identify whether the router LSA advertised to the network expresses the C-plane of the GMPLS network, or whether the router LSA is generated by converting the Opaque LSA expressing the D-plane label path. Consequently, the GMPLS node can judge which router LSA should be used for generating the C-plane topology and which router LSA should be used for generating the D-plane topology.

There may be provided an LSA converting device which converts an Opaque LSA expressing a D-plane label path in the GMPLS network into a router LSA, wherein when the label path is a point-to-point Link type of a numbered system, the LSA converting device may change a Link-State Advertisement Type to 1 corresponding to the router LSA, copy an Advertising Router value, turn on a label path conversion flag which shows that the Opaque LSA expressing the D-plane label path in the GMPLS network is converted into the router LSA, copy a Link ID field value in the Opaque LSA to a Link ID field of the router LSA, and copy a Local interface IP address field value in the Opaque LSA to a Link Data field of the router LSA expressing a router interface's IP address.

Therefore, it becomes possible to generate a router LSA which plays a role of advertising the GMPLS label path to the MPLS network.

There may be provided an LSA converting device which converts an Opaque LSA expressing a D-plane label path in the GMPLS network into a router LSA, wherein when the label path is a point-to-point Link type of an unnumbered system, the LSA converting device may change a Link-State Advertisement Type to 1 corresponding to the router LSA, copy an Advertising Router value, turns on a label path conversion flag which shows that the Opaque LSA expressing the D-plane label path in the GMPLS network is converted into the router LSA, copy a Link ID field value in the Opaque LSA to a Link ID field of the router LSA, and copy a Link Local Identifiers field value in the Opaque LSA to a Link Data field of the router LSA expressing an ifIndex value.

Therefore, it becomes possible to generate a router LSA which plays a role of advertising the GMPLS label path to the MPLS network.

There may be provided an LSA converting device which converts an Opaque LSA expressing a D-plane label path in the GMPLS network into a router LSA, wherein when the label path is a multi-access Link type, the LSA converting device may change a Link-State Advertisement Type to 1 corresponding to the router LSA, copy an Advertising Router value, turn on a label path conversion flag which shows that the Opaque LSA expressing the D-plane label path in the GMPLS network is converted into the router LSA, copy a Link ID field value in the Opaque LSA to a Link ID field of the router LSA, and copy a Local interface IP address field value in the Opaque LSA to a Link Data field of the router LSA expressing a router interface's IP address.

Therefore, it becomes possible to generate a router LSA which plays a role of advertising the GMPLS label path to the MPLS network.

There may be provided an LSA identifying device which receives a router LSA generated by another GMPLS+IP/MPLS node and identifies whether the router LSA advertises a C-plane of the GMPLS network, or whether the router LSA is obtained by converting an Opaque LSA expressing the GMPLS label path; and a link state holding device which holds link state information of the GMPLS network, wherein the LSA identifying device may search the link state holding device of the GMPLS+IP/MPLS node itself using an Advertising Router value and a label path conversion flag included in the received router LSA as a key, and when link state information having the same Advertising Router value as the received router LSA and having the label path conversion flag turned on is held in the link state holding device, the LSA identifying device may judge that the received router LSA is obtained by converting the Opaque LSA expressing the GMPLS label path.

Therefore, it becomes possible to identify whether the router LSA advertised to the network expresses the C-plane of the GMPLS network, or whether the router LSA is generated by converting the Opaque LSA expressing the D-plane label path. Consequently, the GMPLS node can judge which router LSA should be used for generating the C-plane topology and which router LSA should be used for generating the D-plane topology.

There may be provided a device which, when a C-plane topology of the GMPLS network is advertised by the router LSA, an IP/MPLS node receiving the router LSA recognizes the C-plane topology of the GMPLS network, and an IP/MPLS node having information regarding the topology outputs a request to specify the C-plane of the GMPLS network and to establish an MPLS label path, and if there is a GMPLS label path having the corresponding nodes on opposite ends of a C-plane link on a route specified by the request, allocates the specified route to the GMPLS label path.

There may be provided a device which, when a C-plane topology of the GMPLS network is advertised by the router LSA, an IP/MPLS node receiving the router LSA recognizes the C-plane topology of the GMPLS network, and an IP/MPLS node having information regarding the topology outputs a request to specify the C-plane of the GMPLS network and to establish an MPLS label path, and if there is no GMPLS label path having the corresponding nodes on opposite ends of a C-plane link on a route specified by the request, in response to an MPLS label path establishment request output from the IP/MPLS node, newly establishes a label path on a D-plane corresponding to opposite nodes of the C-plane link, and allocates the specified route to the newly established label path.

Therefore, in the case where the MPLS node specifies the C-plane of the GMPLS network as the route, even if there is no corresponding label path on the corresponding link, it becomes possible to automatically and newly establish the corresponding label path and establish the MPLS path using the new label path.

There may be provided a device which, when the GMPLS label path having the corresponding nodes on opposite ends of the C-plane link of the GMPLS network specified by the IP/MPLS node is allocated, and if the GMPLS+IP/MPLS node itself directly receives the request from the IP/MPLS node, transfers data which is transferred from the IP/MPLS node, not to the route specified by the IP/MPLS node, but to the allocated GMPLS label path.

By installing the abovementioned invention related to the routing protocol, in the GMPLS node, it becomes possible to interconnect the GMPLS network and the IP/MPLS network.

A second aspect of the present invention is an IP/MPLS node which is used in a network in which a GMPLS network and an IP network are mixed, the GMPLS network comprising a node having a GMPLS function, the IP network comprising an IP/MPLS node, and which is connected to the GMPLS network.

Here, in the present invention, a GMPLS+IP/MPLS node which constitutes the GMPLS network and which is capable of processing a GMPLS protocol and an IP/MPLS protocol establishes a GMPLS label path of a packet layer with another GMPLS+IP/MPLS nodes in the GMPLS network, the IP/MPLS node comprising a device which holds link state information having a GMPLS label path of the packet layer advertised as a link.

A third aspect of the present invention is a network comprising a GMPLS+IP/MPLS node and an IP/MPLS node according to the present invention wherein the GMPLS and the IP/MPLS are mixed.

A fourth aspect of the present invention is a packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function.

Here, the present invention comprises: a step of providing a GMPLS+IP/MPLS node which is capable of processing a GMPLS protocol and an IP/MPLS protocol and which is directly connected to the IP network among nodes having the GMPLS function constituting the GMPLS network; a step of establishing a GMPLS label path of a packet layer with another GMPLS+IP/MPLS node in the GMPLS network by the GMPLS+IP/MPLS node; and a step of tunnel transferring a packet transferred from the IP/MPLS node with the other GMPLS+IP/MPLS node through the GMPLS label path.

Link state information of the GMPLS label path of the packet layer may be advertised to the IP/MPLS node by a router LSA as a normal link in the IP/MPLS node.

Link state information of the GMPLS label path of the packet layer may be advertised to the IP/MPLS node by an Opaque LSA which can be processed by an MPLS router as a normal link in the IP/MPLS node.

Link state information having the GMPLS label path of the packet layer advertised as the link may be held, and link state information inside of the GMPLS network may be held.

A link of PSC-LSP used for IP/MPLS may be converted from an unnumbered system into a numbered system and be advertised as the link of the numbered system.

The GMPLS network may perform processing in accordance with an unnumbered system, and a link of PSC-LSP used for IP/MPLS may be converted from the unnumbered system into a numbered system and be advertised as the link of the numbered system.

The GMPLS label switch path of the packet layer may be advertised as the link of a numbered system.

The GMPLS network may perform processing in accordance with an unnumbered system, and the GMPLS label switch path of the packet layer may be converted from the unnumbered system into a numbered system, and be advertised as the link of the numbered system.

An IP address may be previously stored, and the stored IP address may be used as an IP address of the link of the numbered system.

In order to convert an Opaque LSA expressing a D-plane label path in the GMPLS network into a router LSA, when the label path is a point-to-point Link type of a numbered system, a Link-State Advertisement Type may be changed to 1 corresponding to the router LSA, an Advertising Router value and an LS Sequence number value may be copied, a Link ID field value in the Opaque LSA may be copied to a Link ID field of the router LSA, and a Local interface IP address field value in the Opaque LSA may be copied to a Link Data field of the router LSA expressing a router interface's IP address.

In order to convert an Opaque LSA expressing a D-plane label path in the GMPLS network into a router LSA, when the label path is a point-to-point Link type of an unnumbered system, a Link-State Advertisement Type may be changed to 1 corresponding to the router LSA, an Advertising Router value and an LS Sequence number value may be copied, a Link ID field value in the Opaque LSA may be copied to a Link ID field of the router LSA, and a Link Local Identifiers field value in the Opaque LSA may be copied to a Link Data field of the router LSA expressing an ifIndex value.

In order to convert an Opaque LSA expressing a D-plane label path in the GMPLS network into a router LSA, when the label path is a multi-access Link type, a Link-State Advertisement Type may be changed to 1 corresponding to the router LSA, an Advertising Router value and an LS Sequence number value may be copied, a Link ID field value in the Opaque LSA may be copied to a Link ID field of the router LSA, and a Local interface IP address field value in the Opaque LSA may be copied to a Link Data field of the router LSA expressing a router interface's IP address.

A router LSA generated by another GMPLS+IP/MPLS node may be received, and in order to identify whether the router LSA advertises a C-plane of the GMPLS network or whether the router LSA is obtained by converting an Opaque LSA expressing the GMPLS label path, a link state holding device of its own GMPLS+IP/MPLS node which holds link state information of the GMPLS network may be searched, using an Advertising Router value and an LS Sequence number value included in the received router LSA as a key, and when link state information having the same Advertising Router and LS Sequence number as the received router LSA is held in the link state holding device, it may be judged that the received router LSA is obtained by converting the Opaque LSA expressing the GMPLS label path.

In order to convert an Opaque LSA expressing a D-plane label path in the GMPLS network into a router LSA, when the label path is a point-to-point Link type of a numbered system, a Link-State Advertisement Type may be changed to 1 corresponding to the router LSA, an Advertising Router value may be copied, a label path conversion flag which shows that the Opaque LSA expressing the D-plane label path in the GMPLS network may be converted into the router LSA may be turned on, a Link ID field value in the Opaque LSA may be copied to a Link ID field of the router LSA, and a Local interface IP address field value in the Opaque LSA may be copied to a Link Data field of the router LSA expressing a router interface's IP address.

In order to convert an Opaque LSA expressing a D-plane label path in the GMPLS network into a router LSA, when the label path is a point-to-point Link type of an unnumbered system, a Link-State Advertisement Type may be changed to 1 corresponding to the router LSA, an Advertising Router value may be copied, a label path conversion flag which shows that the Opaque LSA expressing the D-plane label path in the GMPLS network may be converted into the router LSA is turned on, a Link ID field value in the Opaque LSA may be copied to a Link ID field of the router LSA, and a Link Local Identifiers field value in the Opaque LSA may be copied to a Link Data field of the router LSA expressing an ifIndex value.

In order to convert an Opaque LSA expressing a D-plane label path in the GMPLS network into a router LSA, when the label path is a multi-access Link type, a Link-State Advertisement Type may be changed to 1 corresponding to the router LSA, an Advertising Router value may be copied, a label path conversion flag which shows that the Opaque LSA expressing the D-plane label path in the GMPLS network is converted into the router LSA may be turned on, a Link ID field value in the Opaque LSA may be copied to a Link ID field of the router LSA, and a Local interface IP address field value in the Opaque LSA may be copied to a Link Data field of the router LSA expressing a router interface's IP address.

A router LSA generated by another GMPLS+IP/MPLS node may be received, and in order to identify whether the router LSA advertises a C-plane of the GMPLS network or whether the router is obtained by converting an Opaque LSA expressing the GMPLS label path, a link state holding device of its own GMPLS+IP/MPLS node which holds link state information of the GMPLS network may be searched using an Advertising Router value and a label path conversion flag included in the received router LSA as a key, and when link state information having the same Advertising Router value as the received router LSA and having the label path conversion flag turned on is held in the link state holding device, it may be judged that the received router LSA is obtained by converting the Opaque LSA expressing the GMPLS label path.

The GMPLS+IP/MPLS node may advertise a C-plane topology of the GMPLS network by the router LSA, an IP/MPLS node receiving the router LSA may recognize the C-plane topology of the GMPLS network, an IP/MPLS node having information regarding the topology may output a request to specify the C-plane of the GMPLS network and to establish an MPLS label path, and if there is a GMPLS label path having the corresponding nodes on opposite ends of a C-plane link on a route specified by the request, the GMPLS+IP/MPLS node may allocate the specified route to the GMPLS label path.

The GMPLS+IP/MPLS node may advertise a C-plane topology of the GMPLS network by the router LSA, an IP/MPLS node receiving the router LSA may recognize the C-plane topology of the GMPLS network, an IP/MPLS node having information regarding the topology may output a request to specify the C-plane of the GMPLS network and to establish an MPLS label path, and if there is no GMPLS label path having the corresponding nodes on opposite ends of a C-plane link on a route specified by the request, in response to an MPLS label path establishment request output from the IP/MPLS node as a trigger, the GMPLS+IP/MPLS node may newly establish a label path on a D-plane corresponding to opposed nodes of the C-plane link, and may allocate the specified route to the newly established label path.

When the GMPLS label path having the corresponding nodes on opposite ends of the C-plane link of the GMPLS network specified by the IP/MPLS node is allocated, a GMPLS+IP/MPLS node which directly receives the request from the IP/MPLS node may transfer data which is transferred from the IP/MPLS node, not to the route specified by the IP/MPLS node, but to the allocated GMPLS label path.

The IP/MPLS node may hold link state information having the GMPLS label path of the packet layer advertised as a link.

A fifth aspect of the present invention is a method for configuring a network in which GMPLS and IP/MPLS are mixed, the method comprises the steps of: providing a GMPLS+IP/MPLS node which transfers a packet using the packet communication method of the present invention; and providing an IP/MPLS node which transfers the packet using the packet communication method of the present invention.

According to the present invention, it becomes possible to realize a network having GMPLS and IP/MPLS mixed, in which the IP/MPLS node can be operated as is without replacing the IP/MPLS node with a node having a GMPLS function, even if the GMPLS and IP/MPLS are mixed.

Moreover, according to the present invention, in the case where the GMPLS network and the IP/MPLS network are connected, the routing protocol is normally operated. By performing traffic engineering based on this, it becomes possible to distribute the traffic, and to effectively use the network resources.

BRIEF DESCRIPTION OF DRAWINGS

FIG. 8A shows a numbered system in a GMPLS cloud, and FIG. 8B shows a numbered system outside of a GMPLS cloud.

FIG. 14 shows a management condition of link state information in a network comprising IP/MPLS nodes, GMPLS+IP/MPLS nodes and GMPLS nodes.

FIG. 16 is a table showing the correspondence of parameters of an Opaque LSA and a router LSA.

BEST MODE FOR CARRYING OUT THE INVENTION

Hereunder is a description of GMPLS+IP/MPLS nodes, GMPLS nodes, IP/MPLS nodes, networks, and a method for configuring a network, of an embodiment of the present invention, with reference to the drawings.

Figure 1:
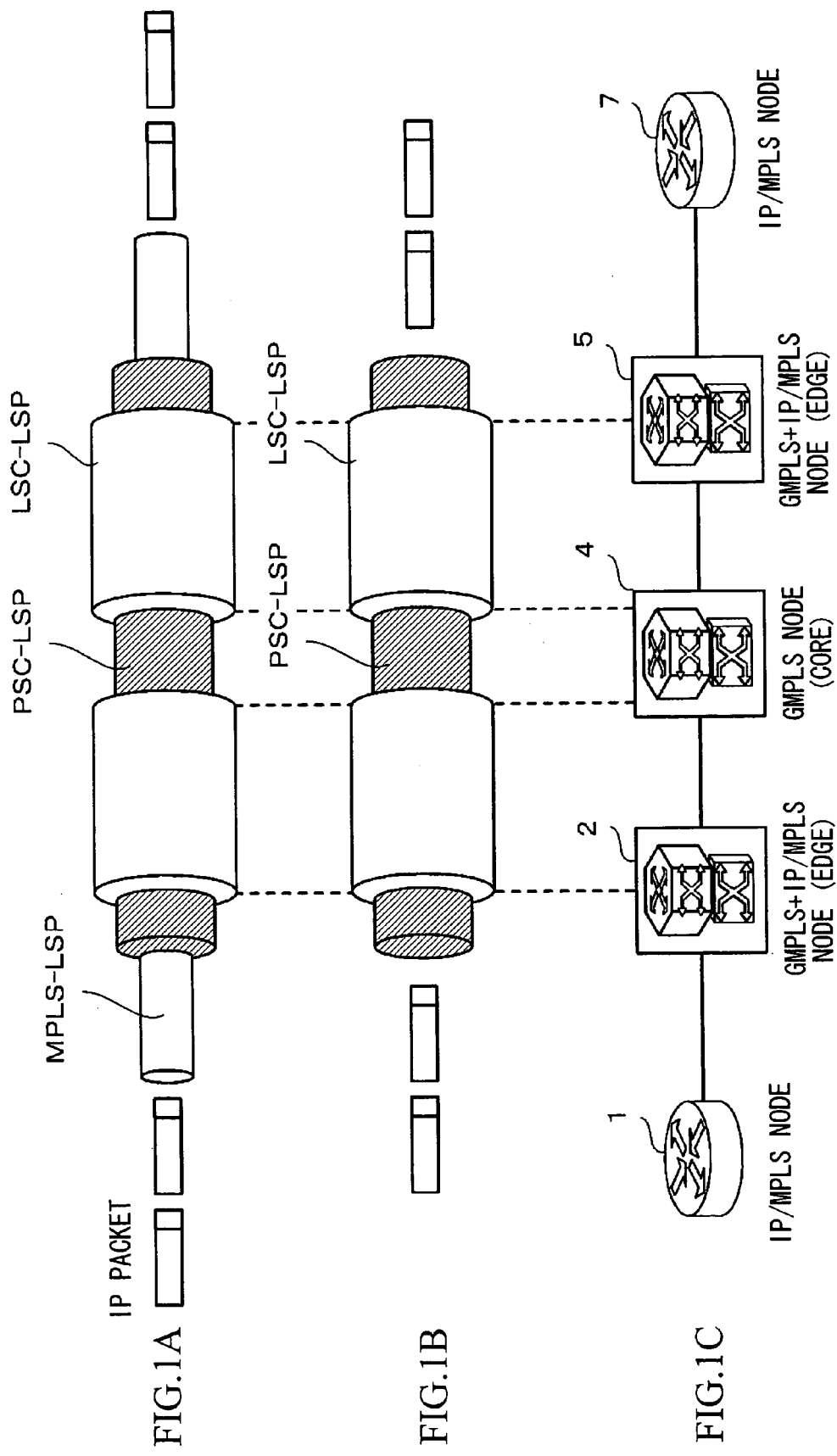
FIG. 1A to FIG. 1C is a conceptual diagram of tunnel transfer in an embodiment of the present invention.

In the network of the embodiment of the present invention, as shown in FIG. 1A to FIG. 1C, an IP packet transferred from an IP/MPLS node is transferred in accordance with tunnel transfer using an MPLS-LSP (FIG. 1A) or a PSC-LSP (FIG. 1B), that is a GMPLS label path of a packet layer established between a GMPLS+IP/MPLS node (edge) 2 and a GMPLS+IP/MPLS node (edge) 5. In the embodiment of the present invention, the description is only regarding one-way, to make the description easily understood. However, the transferring direction may be either two-way or one-way. The description of two-way is omitted since it can be easily deduced from the description of one-way.

Figure 2:
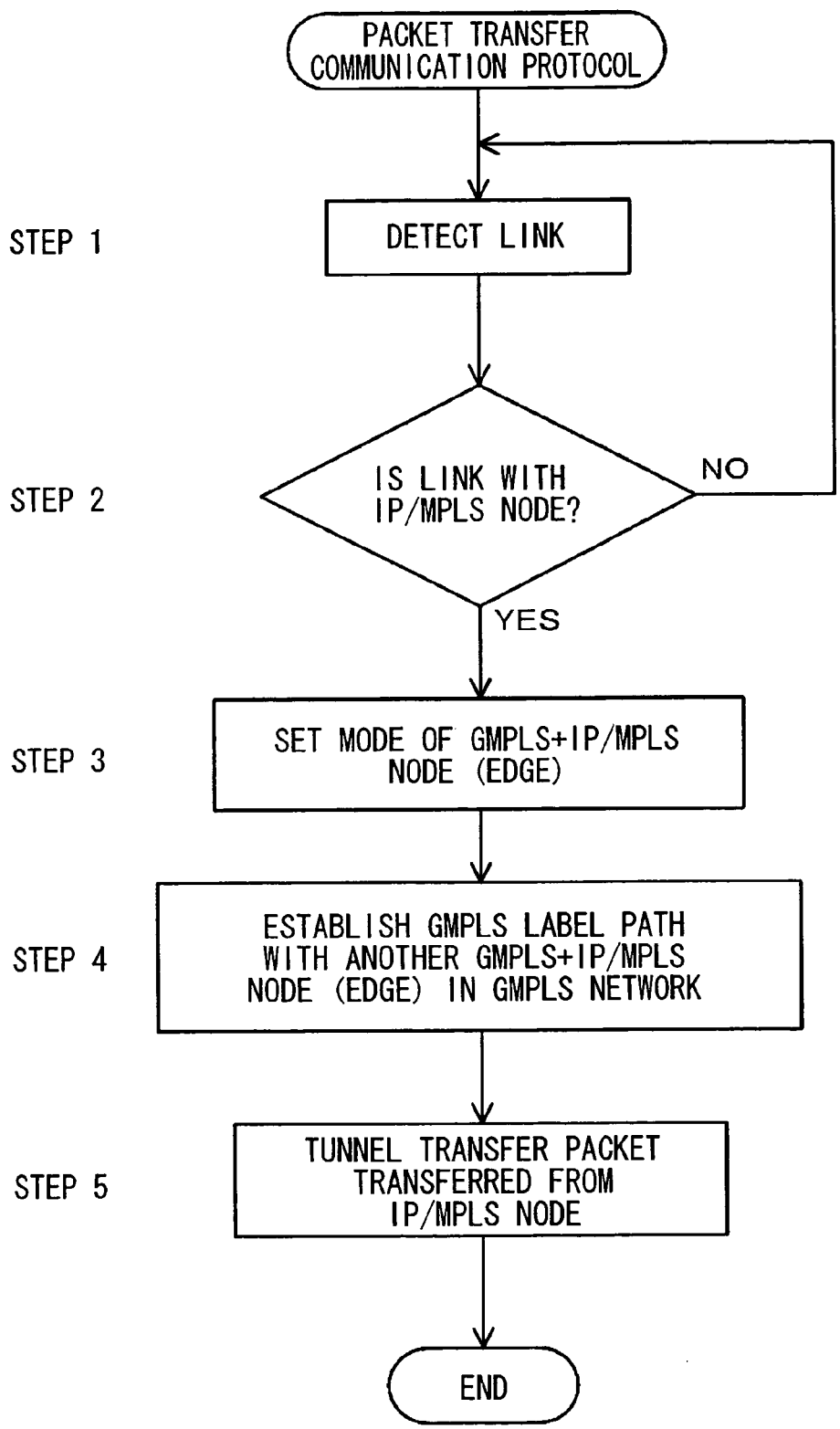
FIG. 2 is a flowchart showing a packet communication protocol of the embodiment of the present invention.

A packet communication protocol in the network of the embodiment of the present invention is described with reference to FIG. 2. The GMPLS+IP/MPLS node detects the link to be connected to the GMPLS+IP/MPLS itself (Step 1). The link with an IP/MPLS node is established (Step 2). Then, the GMPLS+IP/MPLS node recognize itself as the GMPLS+IP/MPLS node (edge) and sets the mode (Step 3). Subsequently, the GMPLS label path of the packet layer is established with another GMPLS+IP/MPLS node (edge) in the GMPLS network (Step 4). When the establishment of the GMPLS label path of the packet layer is completed, the packet transferred from the IP/MPLS node is tunnel transferred to the other GMPLS+IP/MPLS nodes (edge) (Step 5).

Figure 3:
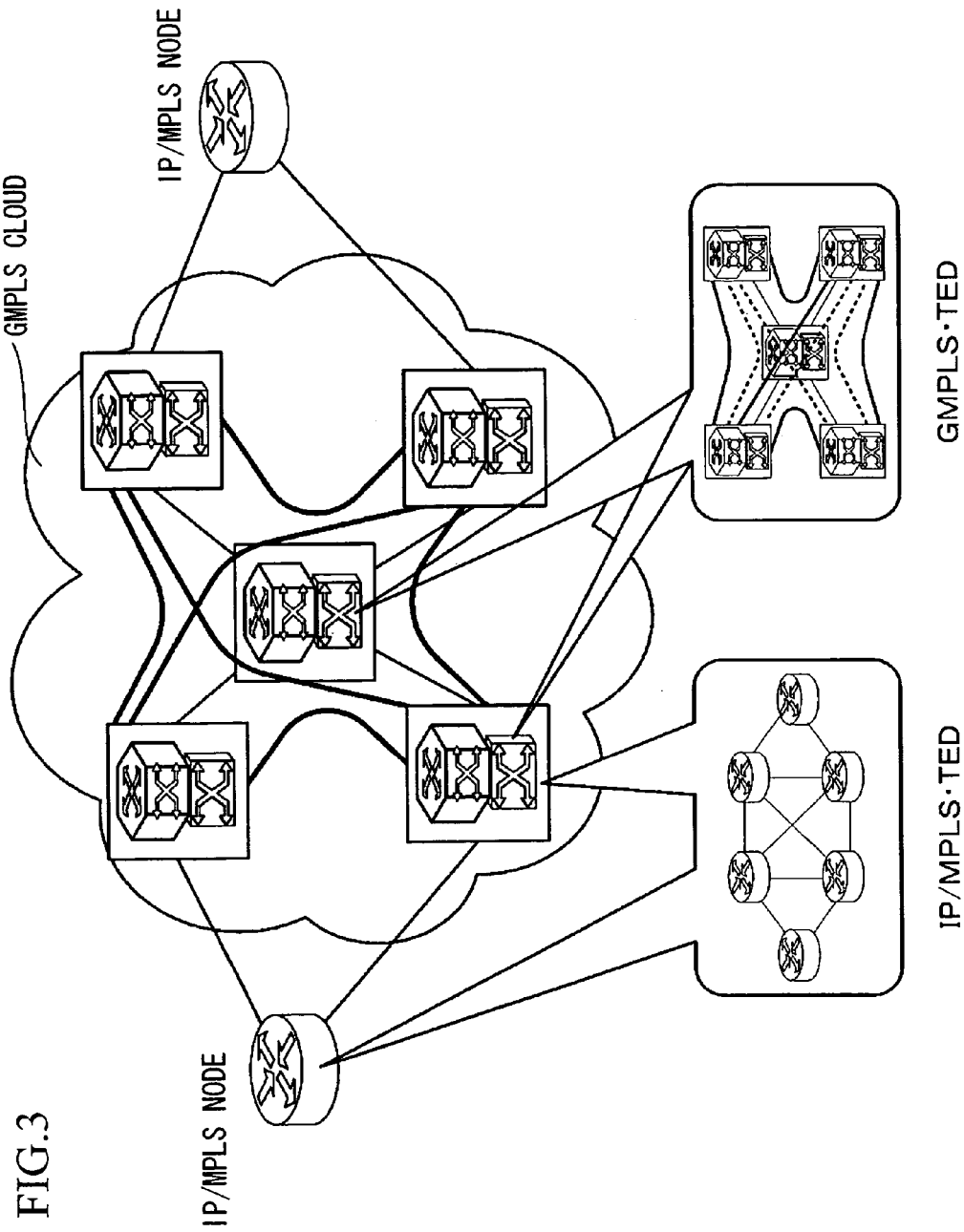
FIG. 3 shows a network comprising IP/MPLS nodes and GMPLS nodes of the embodiment of the present invention.

As shown in FIG. 3, the GMPLS+IP/MPLS nodes of the embodiment of the present invention are used in the network in which a GMPLS network and an IP network are mixed and the GMPLS network comprises nodes having the GMPLS function and the IP network comprises IP/MPLS nodes, and the GMPLS+IP/MPLS nodes constitute the GMPLS network and can deal with the GMPLS protocol and the IP/MPLS protocol.

Figure 4:
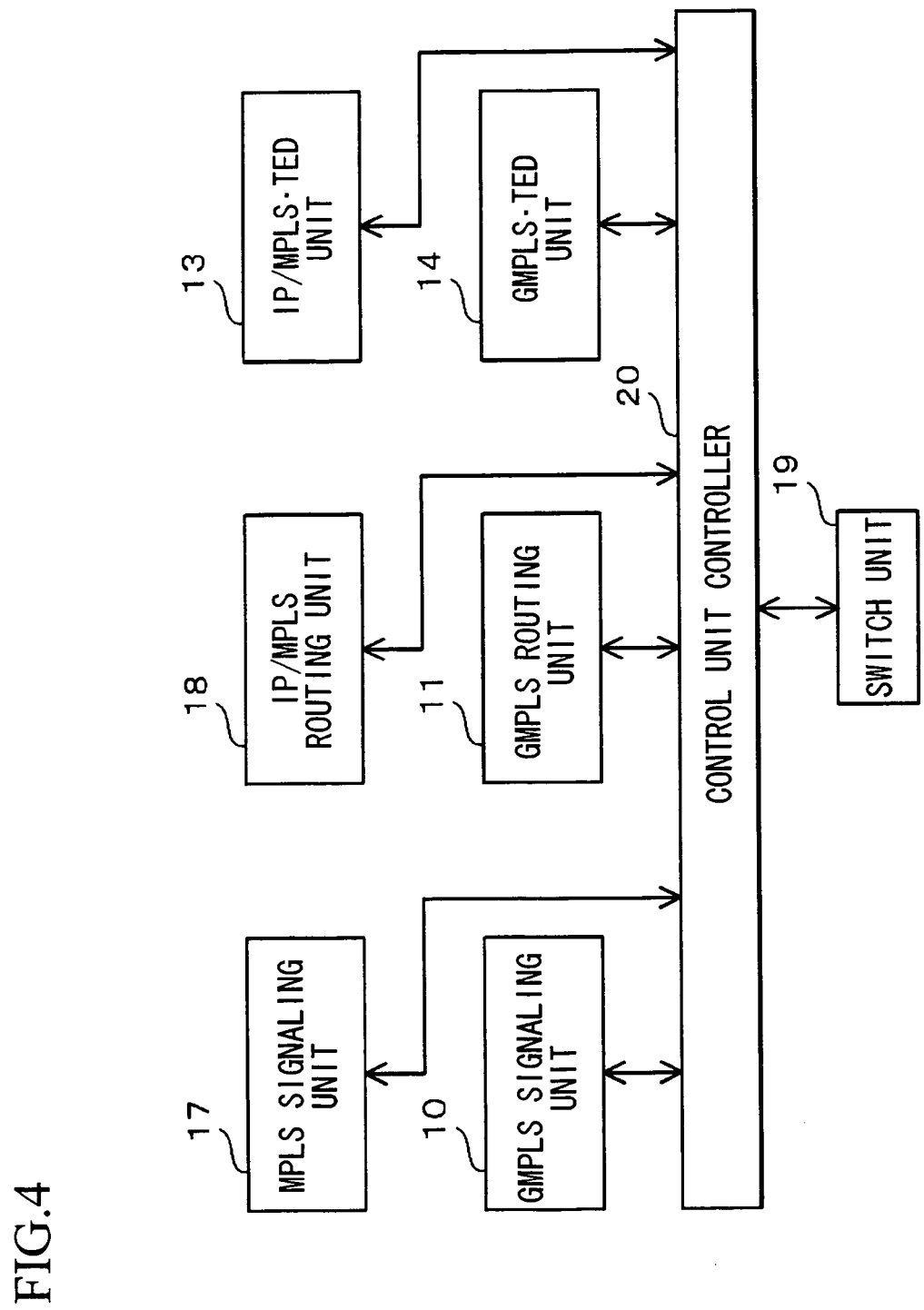
FIG. 4 is a block diagram of a control unit of a GMPLS edge node of the embodiment of the present invention.

Here, as shown in FIG. 4, a feature of the embodiment of the present invention is that there is provided a GMPLS signaling unit 10 which establishes the GMPLS label path of the packet layer with another GMPLS+IP/MPLS node in the GMPLS network, and a GMPLS routing unit 11 which tunnel transfers the packet transferred from the IP/MPLS node with the other GMPLS+IP/MPLS node through the GMPLS label path.

Furthermore, there is provided an IP/MPLS-TED unit 13 which takes the GMPLS label path of the packet layer as a normal link in the IP/MPLS node and advertises the link state information to the IP/MPLS node by a router LSA. The IP/MPLS-TED unit 13 holds the link state information advertised by using the GMPLS label path of the packet layer as the link. Furthermore, it comprises a GMPLS-TED unit 14 which holds the link state information inside of the GMPLS network.

Figure 10:
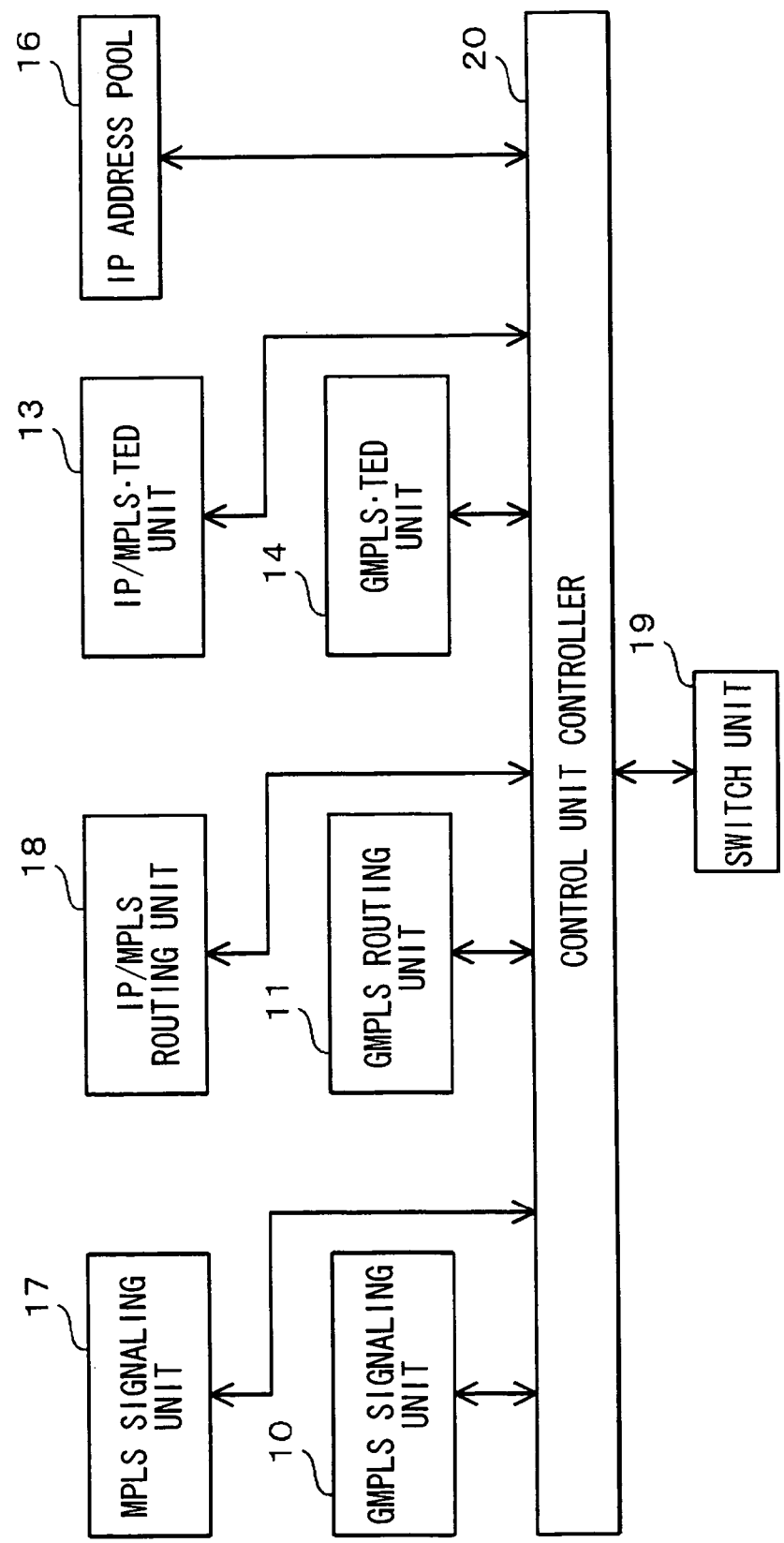
FIG. 10 is a block diagram of a control unit of a GMPLS edge node of the embodiment of the present invention.
Figure 11:
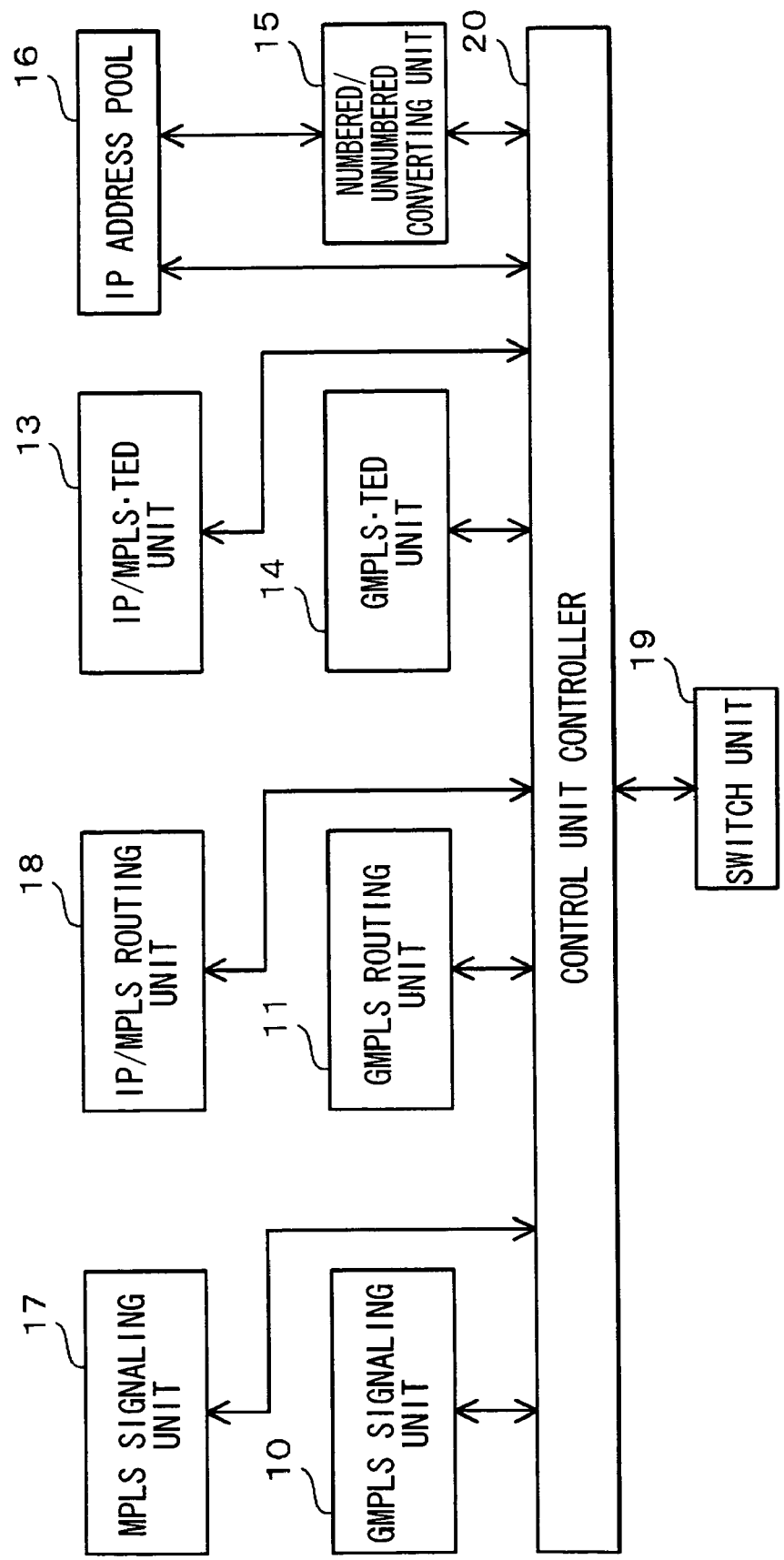
FIG. 11 is a block diagram of a control unit of a GMPLS edge node of the embodiment of the present invention.

Moreover, as shown in FIG. 10, with respect to the PSC-LSP link used for IP/MPLS, there is provided an IP address pool 16 which converts an unnumbered system into a numbered system to advertise as the link of the numbered system. Alternatively, as shown in FIG. 11, the GMPLS network processes in accordance with the unnumbered system, and, there is provided an IP address pool 16 and a numbered/unnumbered converting unit 15 which converts the unnumbered system into the numbered system to advertise as the link of the numbered system with respect to the PSC-LSP link used for IP/MPLS. The numbered/unnumbered converting unit 15 can advertise the GMPLS label switch path of the packet layer as the link of the numbered system.

Alternatively, it is also acceptable that the GMPLS network processes in accordance with the unnumbered system, and the numbered/unnumbered converting unit 15 and the IP address pool 16 are used to convert the GMPLS label switch path of the packet layer of the unnumbered system into a numbered system and advertise as the link of the numbered system.

The IP address pool 16 previously stores the IP address, and the stored IP address is used as the IP address of the link of the numbered system.

Moreover, the GMPLS+IP/MPLS node also includes an MPLS signaling unit 17 and an IP/MPLS routing unit 18 as the function of the IP/MPLS node.

Figure 6:
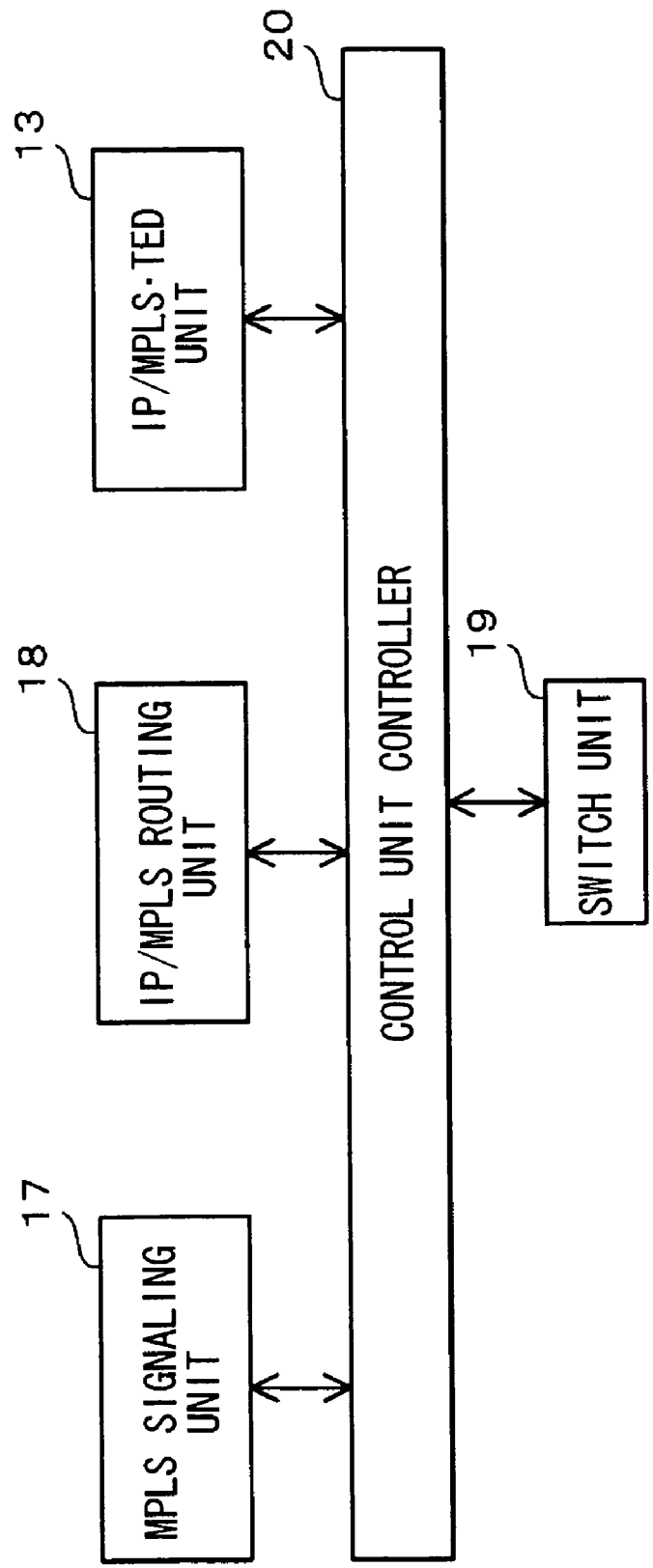
FIG. 6 is a block diagram of a control unit of an IP/MPLS node of the embodiment of the present invention.

As shown in FIG. 6, the IP/MPLS node of the embodiment of the present invention comprises the IP/MPLS-TED unit 13 which holds the link state information advertised using the GMPLS label path of the packet layer as the link. A switch unit 19 switches the paths which are established to the respective nodes.

The network of the embodiment of the present invention includes the GMPLS+IP/MPLS node and the IP/MPLS node of the embodiment of the present invention, wherein GMPLS and IP/MPLS are mixed.

Hereunder is a detailed description of the embodiment of the present invention.

Example 1

The establishment condition of the LSP establishment in example 1 is described using FIG. 1A to FIG. 1C. The GMPLS+IP/MPLS node (edge) 2 and the GMPLS+IP/MPLS node (edge) 5 establish the PSC-LSP. Since the PSC-LSP is established through the LSC-LSP, the LSC-LSP is established before the PSC-LSP is established. The GMPLS+IP/MPLS node (edge) is used as a normal link of IP/MPLS with respect to the IP/MPLS node outside of the GMPLS cloud.

As shown in FIG. 1A, if an MPLS-LSP is established to an IP/MPLS node 1 and an IP/MPLS node 7, the MPLS-LSP uses the PSC-LSP as a normal link with respect to the IP/MPLS node. The IP packet passes inside the MPLS-LSP.

Moreover, as shown in FIG. 1B, in some cases the IP/MPLS node 1 transfers the IP packet to the IP/MPLS node 7 and not through the MPLS-LSP. In this case, the PSC-LSP established to the GMPLS+IP/MPLS node (edge) 2 and the GMPLS+IP/MPLS node (edge) 5 is used as a normal link for the IP/MPLS node.

FIG. 3 shows the management condition of the link state information in the network comprising the IP/MPLS node, the GMPLS+IP/MPLS node, and the GMPLS node. The GMPLS+IP/MPLS node or the GMPLS node in the GMPLS cloud manages the link state information of the GMPLS. For example, if the link state information is advertised in the GMPLS using the routing protocol for the GMPLS, an Opaque LSA is used (for example, refer to Non Patent Documents 2, 3, and 4). Advertisement is performed in the same form as that of the link between the IP/MPLS nodes, so that the PSC-LSP established between the GMPLS+IP/MPLS nodes (edge) is treated as a normal link for the IP/MPLS router. For example, if OSPF (Open Shortest Path First) routing protocol is used, the router LSA is used (for example, refer to Non Patent Document 2).

Figure 5:
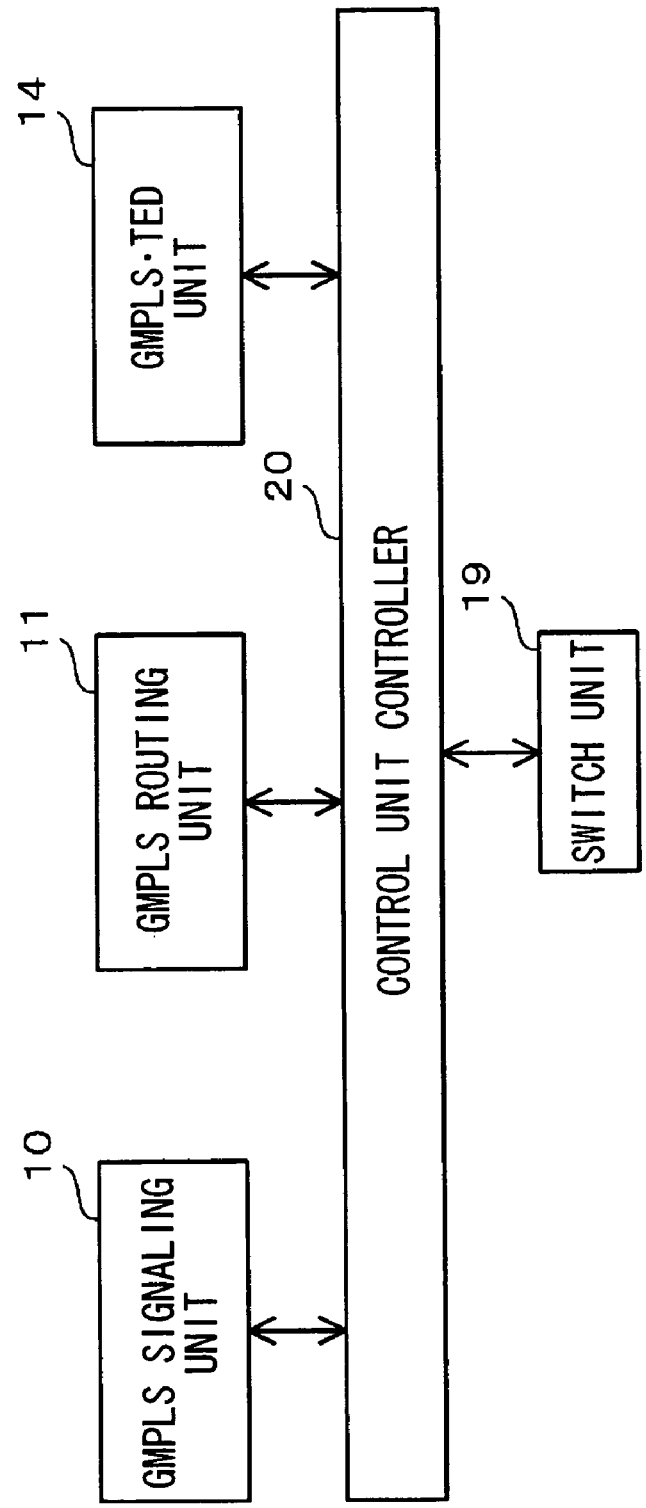
FIG. 5 is a block diagram of a control unit of a GMPLS core node of the embodiment of the present invention.

As shown in FIG. 4, FIG. 10, and FIG. 11, the GMPLS+IP/MPLS node (edge) has the GMPLS-TED unit 14 and the IP/MPLS-TED unit 13. As shown in FIG. 6, the IP/MPLS node has the IP/MPLS-TED unit 13. As shown in FIG. 5, the GMPLS node as a core node (hereunder, GMPLS node (core)) has the GMPLS-TED unit 14. In the IP/MPLS node, the PSC-LSP in the GMPLS cloud is treated as a normal link between the IP/MPLSs. The link state which is advertised by the GMPLS routing protocol is not advertised to the IP/MPLS node.

FIG. 4 shows the structure of a control unit of the GMPLS+IP/MPLS node (edge). The control unit of the GMPLS+IP/MPLS node (edge) comprises; an MPLS signaling unit 17, a GMPLS signaling unit 10, an IP/MPLS routing unit 18, a GMPLS routing unit 11, an IP/MPLS-TED unit 13, and a GMPLS-TED unit 14. They are controlled by a control unit controller 20. The GMPLS signaling unit 10 is operated for example by a GMPLS-RSVP-TE protocol (for example, refer to Non Patent Document 5). The MPLS signaling unit 17 is operated for example by an RSVP-TE protocol (for example, refer to Non Patent Document 6).

FIG. 5 shows the structure of a control unit of the GMPLS node (core) n. The control unit of the GMPLS node (core) comprises a GMPLS signaling unit 10, a GMPLS routing unit 11, and a GMPLS-TED unit 14. They are controlled by a control unit controller 20. The GMPLS node (core) is not necessarily matched with the IP/MPLS protocol.

FIG. 6 shows the structure of a control unit of the IP/MPLS node. The control unit of the IP/MPLS node comprises an MPLS signaling unit 17, an IP/MPLS routing unit 18, and an IP/MPLS-TED unit 13. They are controlled by a control unit controller 20. The IP/MPLS node is not necessarily matched with the GMPLS protocol.

The IP/MPLS node can be operated without considering the GMPLS protocol. In the IP/MPLS node, traffic engineering can be performed without considering the GMPLS protocol. On the other hand, in the GMPLS cloud, traffic engineering can be performed by the GMPLS protocol.

Example 2

In the case of realizing a link interface, there is a numbered system expressed by allocating the IP address, and an unnumbered system expressed by the combination of the IP address being the node identifier and the link identifier which is uniquely allocated in the node. A link expressed using the numbered system is called a numbered link, and a link expressed using the unnumbered system is called an unnumbered link (for example, refer to Non Patent Document 7).

Hereunder is a description of the unnumbered link. The IP address is normally allocated to the link interface in the MPLS network. The link in the network can be identified by the IP address. However, the GMPLS has a capacity of 100 or more wavelengths per fiber. If the IP addresses are allocated to the respective wavelength interfaces, the number of required IP addresses becomes enormous. Moreover, the LSPs of the respective layers are advertised as a TE link with respect to the upper layer so that, if the IP addresses are allocated with respect to the respective TE links, there is concern of a shortage of resources for the IP address.

In view of the above, in the GMPLS, in order to identify the link (hereunder, TE link is simply called link in some cases), the link identifier which is allocated to the link interface is introduced. Although it is required to globally allocate the IP address, it is applicable as long as the link identifier is unique in the respective routers. The link in the network can be identified by the combination of (node identifier, link identifier).

A link expressed by the combination of (node identifier, link identifier) is called an unnumbered link. Unnumbered means that the IP address is not allocated to the link interface. Therefore, in GMPLS, even if the number of wavelengths is increased or the number of TE links is increased, the problem of shortages of IP addresses is solved.

Due to such reasons, the unnumbered system is normally used in the GMPLS cloud. However, in the case where the IP/MPLS node treats only the numbered link and can not treat the unnumbered link, if the PSC-LSP is established between the GMPLS+IP/MPLS nodes (edge), it is necessary to make the PSC-LSP the unnumbered link.

Figure 7A:
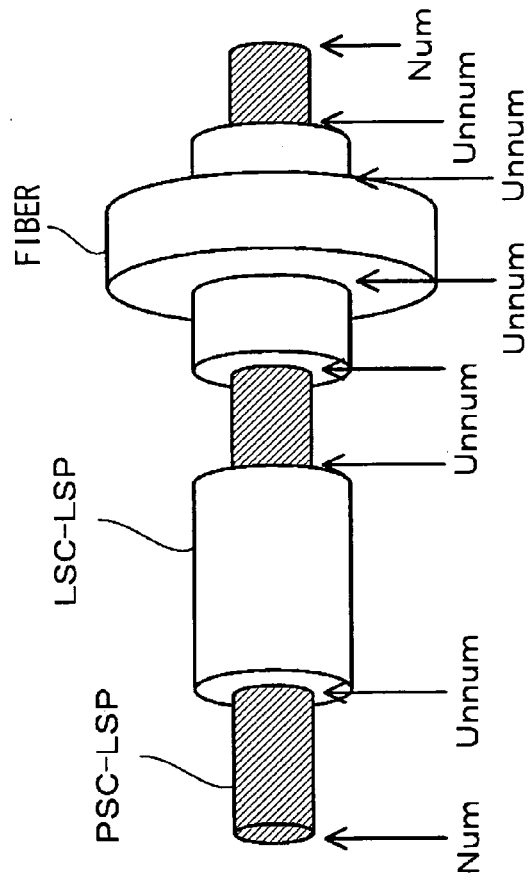
FIG. 7A shows a numbered system in a GMPLS cloud.
Figure 7B:
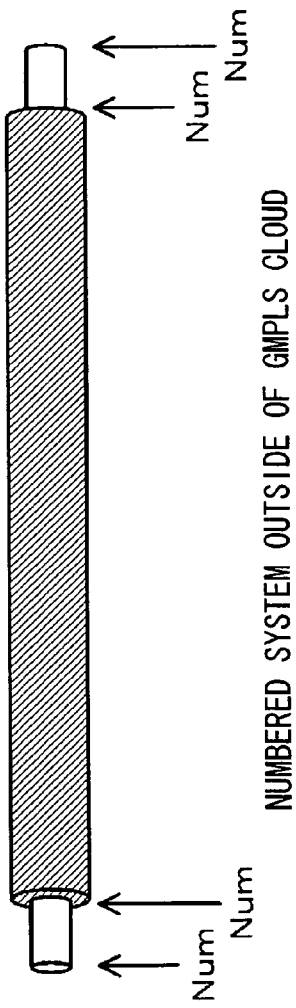
FIG. 7B shows a numbered system outside of a GMPLS cloud.

An example of a numbered link and an unnumbered link is shown in FIG. 7A and FIG. 7B. As shown in FIG. 7A, for the GMPLS+IP/MPLS node or the GMPLS node in the GMPLS cloud, the links of the respective layers are the unnumbered links except for the PSC-LSP. The PSC-LSP is established as the numbered link. As shown in FIG. 7B, for the IP/MPLS node outside of the GMPLS cloud, in the case of the PSC-LSP, the numbered link used within the GMPLS cloud is used.

An example of a numbered link and an unnumbered link is shown in FIG. 8A and FIG. 8B. As shown in FIG. 8A, for the GMPLS+IP/MPLS node or the GMPLS node in the GMPLS cloud, the links of all the layers in the GMPLS cloud are the unnumbered links. As shown in FIG. 8B, for the IP/MPLS node outside of the GMPLS cloud, in the case of the PSC- LSP, the numbered link used within the GMPLS cloud is converted into the unnumbered link and used.

In this way, even in the case where the IP/MPLS node treats only the numbered link, the IP/MPLS node can be operated without considering the GMPLS protocol, by establishing the PSC-LSP as the numbered link.

Example 3

In the case where the PSC-LSP is treated as the numbered link, the IP address is required to be allocated to the interface of this link in the GMPLS+IP/MPLS node (edge). The value of the IP address must be allocated uniquely inside the network. The IP address allocated to the PSC-LSP interface of the respective nodes should not be overlapped.

Figure 9:
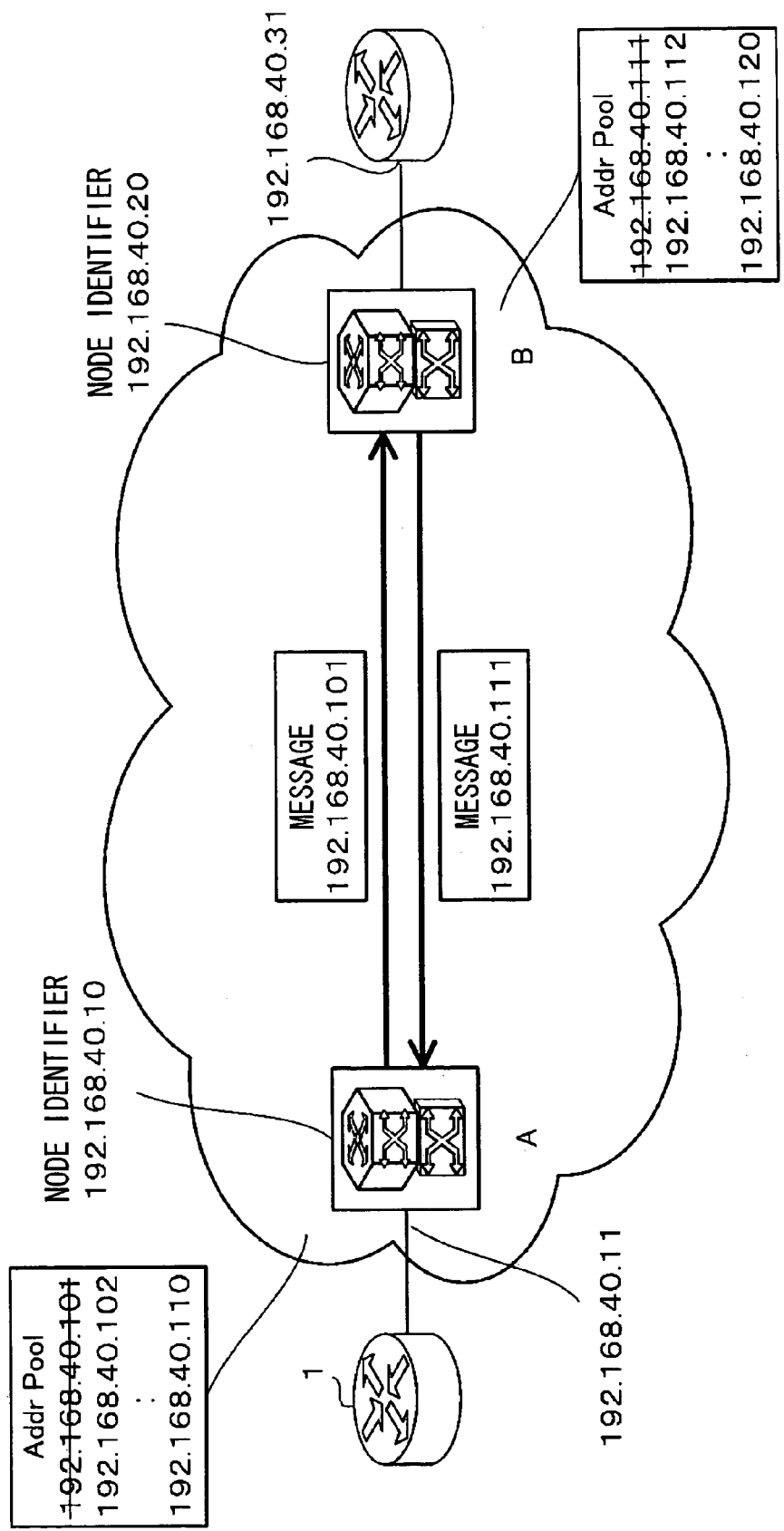
FIG. 9 is an explanatory diagram of the allocation of IP addresses to a numbered link of the embodiment of the present invention.

As shown in FIG. 9, assuming that the PSC-LSP is dynamically established, the respective GMPLS+IP/MPLS nodes (edge) previously store the IP address which can be allocated by its own node, in the IP address pool 16. The IP address stored in the IP address pool 16 is the unique value in the network. If the PSC-LSP is established, the respective nodes select one IP address to be allocated to the link from the IP address pool 16, and obtain it as the IP address of the link of this interface. The operation is performed on the opposite ends of the GMPLS+IP/MPLS node (edge). The IP address obtained by its own node is notified by a message to the opposite GMPLS+IP/MPLS node (edge).

FIG. 10 shows the structure of a GMPLS+IP/MPLS node (edge) which has an IP address pool 16. The structure in FIG. 10 corresponds to the establishment example in FIG. 7A and FIG. 7B. That is, in the establishment example in FIG. 7A and FIG. 7B, as shown in FIG. 7A, the PSC-LSP is identified by the numbered system, even in the GMPLS cloud. FIG. 11 shows the structure of a GMPLS+IP/MPLS node (edge) which has an IP address pool 16 and a numbered/unnumbered converting unit 15. The structure in FIG. 11 corresponds to the establishment example in FIG. 8A and FIG. 8B. That is, in the establishment example in FIG. 8A and FIG. 8B, as shown in FIG. 8A, the numbered/unnumbered converting unit 15 can be used so as to completely apply an unnumbered system, in the GMPLS cloud.

In this manner, even if the PSC-LSP is dynamically established, by previously storing the IP address in the IP address pool 16, the IP address of the link can also be dynamically allocated.

Example 4

Figure 12:
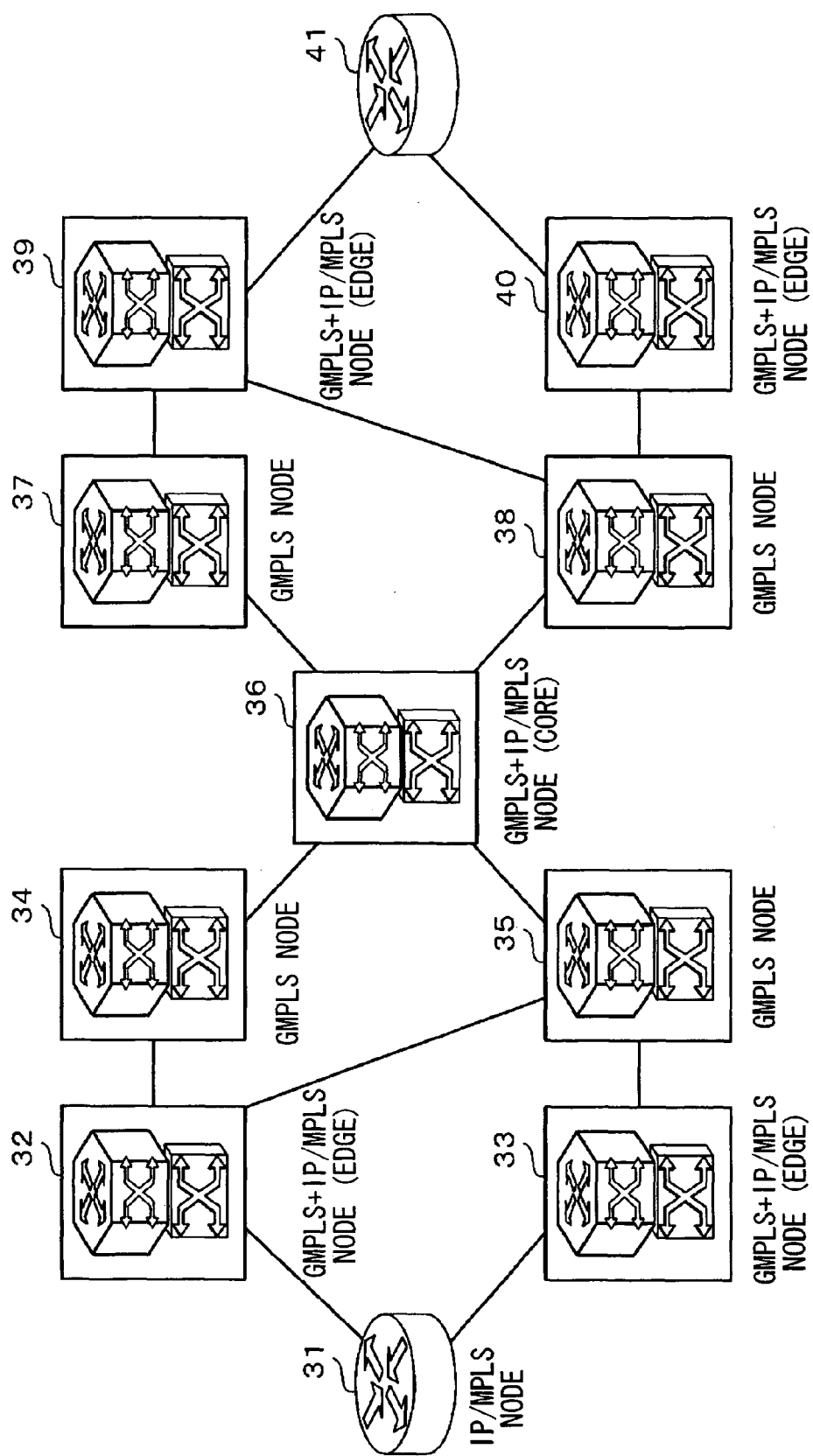
FIG. 12 shows a network comprising IP/MPLS nodes, GMPLS+IP/MPLS nodes and GMPLS nodes.

In example 1 to example 3 described above, the GMPLS+IP/MPLS node in the GMPLS network which can process the IP/MPLS protocol is limited to the edge node which is directly connected to the IP network. In example 4, as shown in FIG. 12, GMPLS+IP/MPLS nodes are positioned in the GMPLS network so that even the core node which is not directly connected to the IP network can process the GMPLS protocol and the IP/MPLS protocol.

Figure 13A:
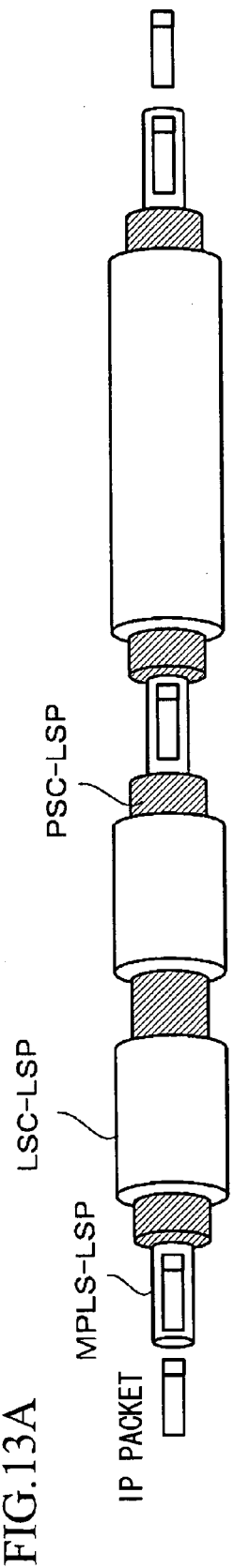
FIG. 13A to FIG. 13C is an explanatory diagram of an establishment condition of LSP establishment in an example 4.
Figure 13B:
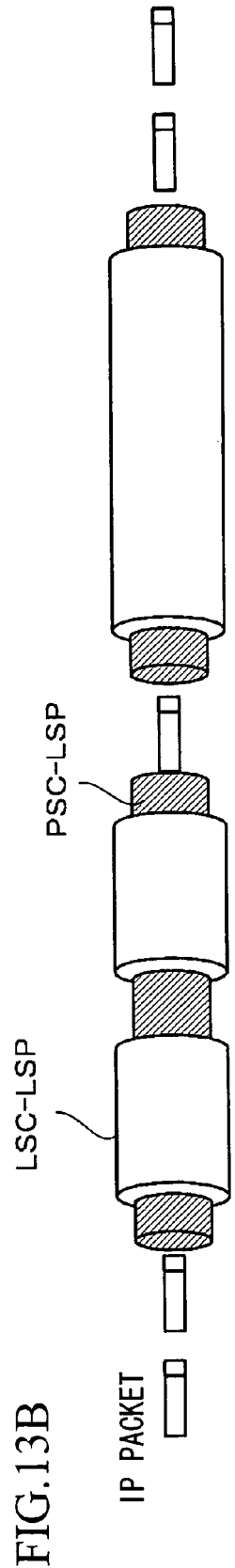
Figure 13C:
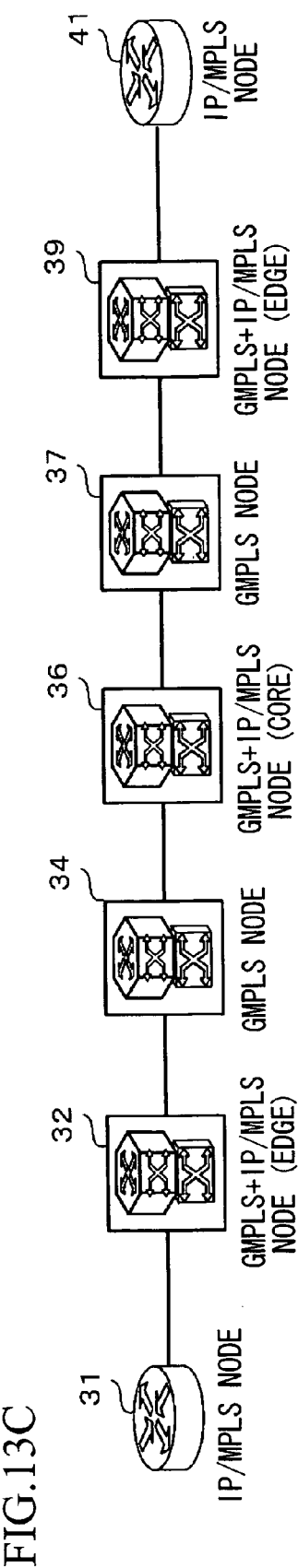

The establishment condition of the LSP establishment in example 4 is described with reference to FIG. 13A to FIG. 13C. The PSC-LSP is established between a GMPLS+IP/MPLS node (edge) 32 and a GMPLS+IP/MPLS node (core) 36. Moreover, the PSC-LSP is established between the GMPLS+IP/MPLS node (core) 36 and a GMPLS+IP/MPLS node (edge) 39. Since the PSC-LSP is established through the LSC-LSP, the LSC-LSP is established before the PSC-LSP is established. Therefore, the GMPLS+IP/MPLS node (edge) is used as a normal link of the IP/MPLS, for the IP/MPLS node outside of the GMPLS network.

If an MPLS-LSP is established to an IP/MPLS node 31 and an IP/MPLS node 41, the MPLS-LSP uses the PSC-LSP as a normal link for the IP/MPLS node. Therefore, the IP packet passes through the MPLS-LSP.

Moreover, in some cases the IP/MPLS node 31 transfers the IP packet to the IP/MPLS node 41, not through the MPLS-LSP. In this case, the PSC-LSPs established between the GMPLS+IP/MPLS node (edge) 32 and the GMPLS+IP/MPLS node (core) 36, and between the GMPLS+IP/MPLS node (core) 36 and the GMPLS+IP/MPLS node (edge) 39 are used as a normal link for the IP/MPLS node.

FIG. 14 shows the management condition of the link state information in the network comprising the IP/MPLS node, the GMPLS+IP/MPLS node, and the GMPLS node. In FIG. 14, topology information held by the IP/MPLS node is shown. The difference of example 4 from example 1 is that the GMPLS+IP/MPLS node (core) 36 can behave as the IP/MPLS router for the IP/MPLS network, even if the GMPLS+IP/MPLS node (core) 36 is not directly connected to the IP/MPLS network.

The GMPLS node in the GMPLS cloud manages the link state of the GMPLS. For example, if the link state is advertised in the GMPLS using the routing protocol for GMPLS, Opaque LSA is used (for example, refer to Non Patent Documents 2, 4, and 8). The PSC-LSP established between the GMPLS+IP/MPLS nodes is advertised in the same form as the link between the IP/MPLS nodes, so that it can be treated as a normal link for the IP/MPLS router. For example, if OSPF routing protocol is used, the router LSA is used (for example, refer to Non Patent Document 2).

The GMPLS+IP/MPLS node (edge) has the GMPLS-TED and the IP/MPLS-TED. The IP/MPLS node has the IP/MPLS-TED. The GMPLS+IP/MPLS node (core) has the GMPLS-TED. In the IP/MPLS node, the PSC-LSP in the GMPLS cloud is treated as a normal link between the IP/MPLSs. The link state which is advertised by the GMPLS routing protocol is not advertised to the IP/MPLS node.

In example 4, compared to example 1, it can behave as the IP/MPLS router even if it is not the GMPLS+IP/MPLS node (edge). Therefore traffic engineering can be flexibly performed.

Example 5

In example 1 and example 4, if the OSPF routing protocol is used so as to advertise the PSC-LSP to the IP/MPLS network, the router LSA is used. As another scheme, an Opaque LSA within a range of the MPLS parameters not using a GMPLS extension may be used (for example, refer to Non Patent Document 8). In this case, the link state information of the GMPLS label path is advertised to the IP/MPLS node by the Opaque LSA which can be processed by the MPLS router, as a normal link in the IP/MPLS node. Therefore, the MPLS traffic engineering can be performed in the IP/MPLS network.

Example 6

The respective examples shown below are modified versions of the abovementioned examples 1 to 5. Firstly, the modified points in examples 1 to 5 are described.

Generally, the GMPLS network comprises two types of networks. The first is a network for transferring the control packet of the protocol which controls the network, represented by the routing protocol or the signaling protocol. This network is called a Control Plane (C-plane). The second is a network where the label path is established by the control protocol. This network is called a Data Plane (D-plane) and the user's data packet is transferred through the label path of this D-plane.

In the GMPLS network, the network topology is advertised by the routing protocol. For example, in the case of an OSPF routing protocol, the network topology of the C-plane is advertised by the router LSA, and the network topology comprising the label path of the D-plane is advertised by the Opaque LSA.

As shown in the abovementioned examples, when the label path is advertised to the IP/MPLS network, it is advertised by the router LSA (since it is a special router LSA for advertising the label path to the IP/MPLS network, it is called a "label path router LSA" hereunder). However, in the abovementioned examples, this label path router LSA is also advertised to the inside of the GMPLS network. Generally, the GMPLS node manages the C-plane and the D-plane separately. However if the label path router LSA is advertised, the GMPLS network can not distinguish whether the advertised router LSA is the original router LSA that expresses the C-plane or the label path router LSA. That is, a network having the C-plane and the label path mixed is recognized.

Hereunder is a description of a method for solving such problems in the routing protocol in the respective examples.

The GMPLS+IP/MPLS node in the respective examples described below is a version having components added to the GMPLS+IP/MPLS node in the respective examples described above. Therefore, in the respective examples below, only the components of these characteristic parts are illustrated, and the components of the GMPLS+IP/MPLS node which are already shown in the respective examples described above (refer to FIG. 4, FIG. 10, FIG. 11 and the like) are not illustrated.

As described before, the GMPLS+IP/MPLS node advertises the link state information of the GMPLS label path of the packet layer to the IP/MPLS node by the router LSA as the normal link in the IP/MPLS node. Therefore, the GMPLS+IP/MPLS node has the function of converting the Opaque LSA for advertising the label path in the GMPLS network, into the router LSA to advertise it to the IP/MPLS network. Moreover, at the same time advertising the router LSA, the GMPLS+IP/MPLS node also has the function of generating the Opaque LSA having a given flag for explicitly showing that the GMPLS+IP/MPLS node itself advertises the label path to the IP/MPLS network, to advertise it. This flag also shows that the Opaque LSA for advertising the label path in the GMPLS network is converted into the router LSA. Therefore it is called a "label path conversion flag" hereunder.

Figure 15:
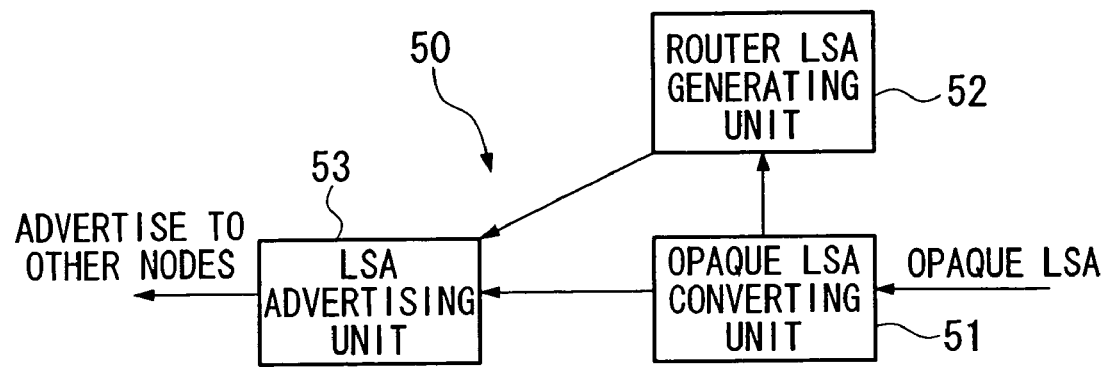
FIG. 15 is a block diagram showing the structure of an LSA converting unit provided for the GMPLS+IP/MPLS node according to an example 6.

FIG. 15 is a block diagram showing the structure of an LSA converting unit 50 provided in the GMPLS+IP/MPLS node, according to the present example. This LSA converting unit 50 realizes the two functions described above. It comprises an Opaque LSA converting unit 51, a router LSA generating unit 52, and an LSA advertising unit 53.

The Opaque LSA converting unit 51 outputs the Opaque LSA for advertising to the IP/MPLS network, to the router LSA generating unit 52, and adds the label path conversion flag to the Opaque LSA, then outputs it to the LSA advertising unit 53. The router LSA generating unit 52 converts the Opaque LSA output from the Opaque LSA converting unit 51 into the router LSA, and outputs it to the LSA advertising unit 53. The LSA advertising unit 53 advertises the Opaque LSA having the added label path conversion flag which is output from the Opaque LSA converting unit 51 and the router LSA which is output from the router LSA generating unit 52, to the other nodes.

FIG. 16 shows the correspondence of the Opaque LSA parameters used in GMPLS, and the router LSA parameters used in MPLS. Examples of parameters relevant to the present application among the parameters not shown in the drawings include Advertising Router and LS Sequence number which are common to the Opaque LSA and the router LSA.

Next is a description of the operation performed by the LSA converting unit 50 for converting the Opaque LSA expressing the label path of the D-plane in the GMPLS network, into the router LSA.

Case (1): The Label Path is the Numbered System, and the Link Type is Point-to-Point.

The LSA converting unit 50 changes the Link-State Advertisement Type to 1, copies an Advertising Router value and an LS Sequence number value, copies the Link ID field value in the Opaque LSA to the Link ID field of the router LSA, and copies the Local interface IP address field value in the Opaque LSA to the Link Data field of the router LSA expressing the router interface's IP address. A "1" for the value of the Link-State Advertisement Type means the router LSA.

Case (2): The Label Path is the Unnumbered System, and the Link Type is Point-to-Point.

The LSA converting unit 50 changes the Link-State Advertisement Type to 1, copies an Advertising Router value and an LS Sequence number value, copies the Link ID field value in the Opaque LSA to the Link ID field of the router LSA, and copies the Link Local Identifiers field value in the Opaque LSA to the Link Data field of the router LSA expressing the ifIndex value.

Case (3): The Link Type of the Label Path is Multi-Access.

The LSA converting unit 50 changes the Link-State Advertisement Type to 1, copies an Advertising Router value and an LS Sequence number value, copies the Link ID field value in the Opaque LSA to the Link ID field of the router LSA, and copies the Local interface IP address field value in the Opaque LSA to the Link Data field of the router LSA expressing the router interface's IP address.

By installing the above functions, it becomes possible to generate a router LSA which plays a role of advertising the GMPLS label path to the MPLS network. As shown in FIG. 16, the router LSA thus generated reflects values in the original Opaque LSA, and copies the Advertising Router and the LS sequence number to succeed them.

Example 7

Figure 17:
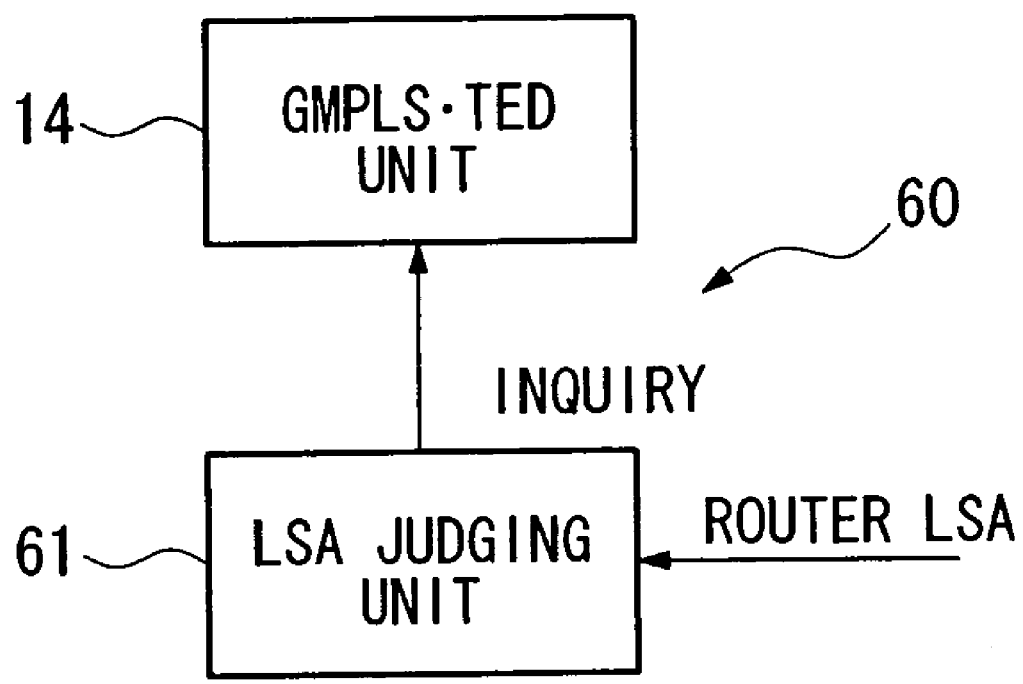
FIG. 17 is a block diagram showing a structure of a router LSA identification unit provided for the GMPLS+IP/MPLS node according to an example 7.

FIG. 17 is a block diagram showing a structure of a router LSA identifying unit 60 provided in the GMPLS+IP/MPLS node according to the present example. This router LSA identifying unit 60 comprises an LSA judging unit 61 and the abovementioned GMPLS-TED unit 14.

The LSA judging unit 61 inquires to the GMPLS-TED unit 14 of its own node, so that it can identify whether the router LSA advertises the C-plane of the GMPLS, or whether it is converted from the GMPLS label path, in the case where the router LSA generated by another node has been received.

That is, the LSA judging unit 61 searches in the GMPLS-TED unit 14 using as a key, the Advertising Router value and the LS Sequence number value included in the router LSA received from another node. If an Opaque LSA in which the Advertising Router value and the LS Sequence number value are the same as those in the received router LSA is stored in the GMPLS-TED unit 14, it judges that the received router LSA is generated by converting the Opaque LSA expressing the GMPLS label path (that is, the label path router LSA).

By installing the above functions, it becomes possible to identify whether the router LSA advertised to the network expresses the C-plane of the GMPLS network or whether it is generated by converting the Opaque LSA expressing the D-plane label path. Therefore, the GMPLS node can determine which router LSA should be used for generating the C-plane topology and which router LSA should be used for generating the D-plane topology.

Example 8

The present example is another example of generating a router LSA which plays a role of advertising the GMPLS label path to the MPLS network. The structure of the GMPLS+IP/MPLS node according to the present example is similar to that of example 6, but the operation of the LSA converting unit 50 is partially different from that of example 6.

Hereunder is a description of the operation of the LSA converting unit 50 which converts the Opaque LSA into the router LSA.

Case (1): The Label Path is the Numbered System, and the Link Type is Point-to-Point.

The LSA converting unit 50 changes the Link-State Advertisement Type to 1, copies an Advertising Router value, turns the label path conversion flag on, copies the Link ID field value in the Opaque LSA to the Link ID field of the router LSA, and copies the Local interface IP address field value in the Opaque LSA to the Link Data field of the router LSA expressing the router interface's IP address.

Case (2): The Label Path is the Unnumbered System, and the Link Type is Point-to-Point.

The LSA converting unit 50 changes the Link-State Advertisement Type to 1, copies an Advertising Router value, turns the label path conversion flag on, copies the Link ID field value in the Opaque LSA to the Link ID field of the router LSA, and copies the Link Local Identifiers field value in the Opaque LSA to the Link Data field of the router LSA expressing the ifIndex value.

Case (3): The Link Type of the Label Path is Multi-Access.

The LSA converting unit 50 changes the Link-State Advertisement Type to 1, copies an Advertising Router value, turns the label path conversion flag on, copies the Link ID field value in the Opaque LSA to the Link ID field of the router LSA, and copies the Local interface IP address field value in the Opaque LSA to the Link Data field of the router LSA expressing the router interface's IP address.

By installing the above functions, it becomes possible to generate a router LSA which plays a role of advertising the GMPLS label path to the MPLS network. As shown in FIG. 16, the router LSA thus generated reflects values in the original Opaque LSA, copies an Advertising Router value to succeed it, and turns the label path conversion flag on.

Example 9

The present example is another example of identifying whether the router LSA generated by another node advertises the GMPLS C-plane or whether it is converted from the GMPLS label path. The structure of the GMPLS+IP/MPLS node according to the present example is similar to that of example 7, but the operation of the LSA judging unit 61 is different from that of example 7.

That is, the LSA judging unit 61 according to the present example searches in the GMPLS-TED unit 14 of its own node using as a key, the Advertising Router value and the label path conversion flag included in the router LSA received from another node. If an Opaque LSA with the same Advertising Router value and with the label conversion flag turned on is stored in the GMPLS-TED unit 14, it judges that the received router LSA is a label path router LSA generated by converting the Opaque LSA expressing the GMPLS label path.

By implementing the above functions, it becomes possible to identify whether the router LSA advertised to the network expresses the C-plane of the GMPLS network or whether it is generated by converting the Opaque LSA expressing the D-plane label path. Therefore, the GMPLS node can determine which router LSA should be used for generating the C-plane topology and which router LSA should be used for generating the D-plane topology.

Example 10

Figure 18:
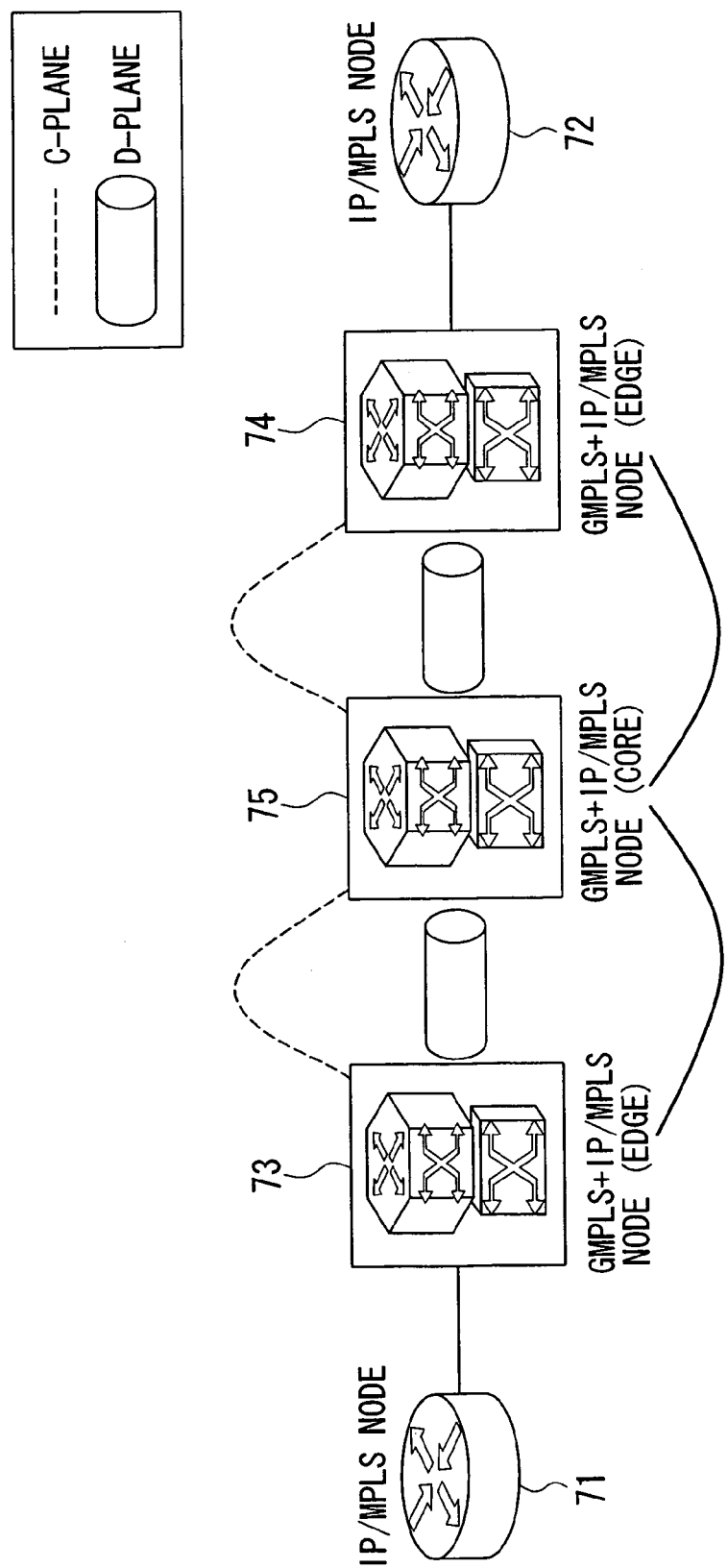
FIG. 18 is a block diagram showing a structure of a network for explaining an example 10.
Figure 19:
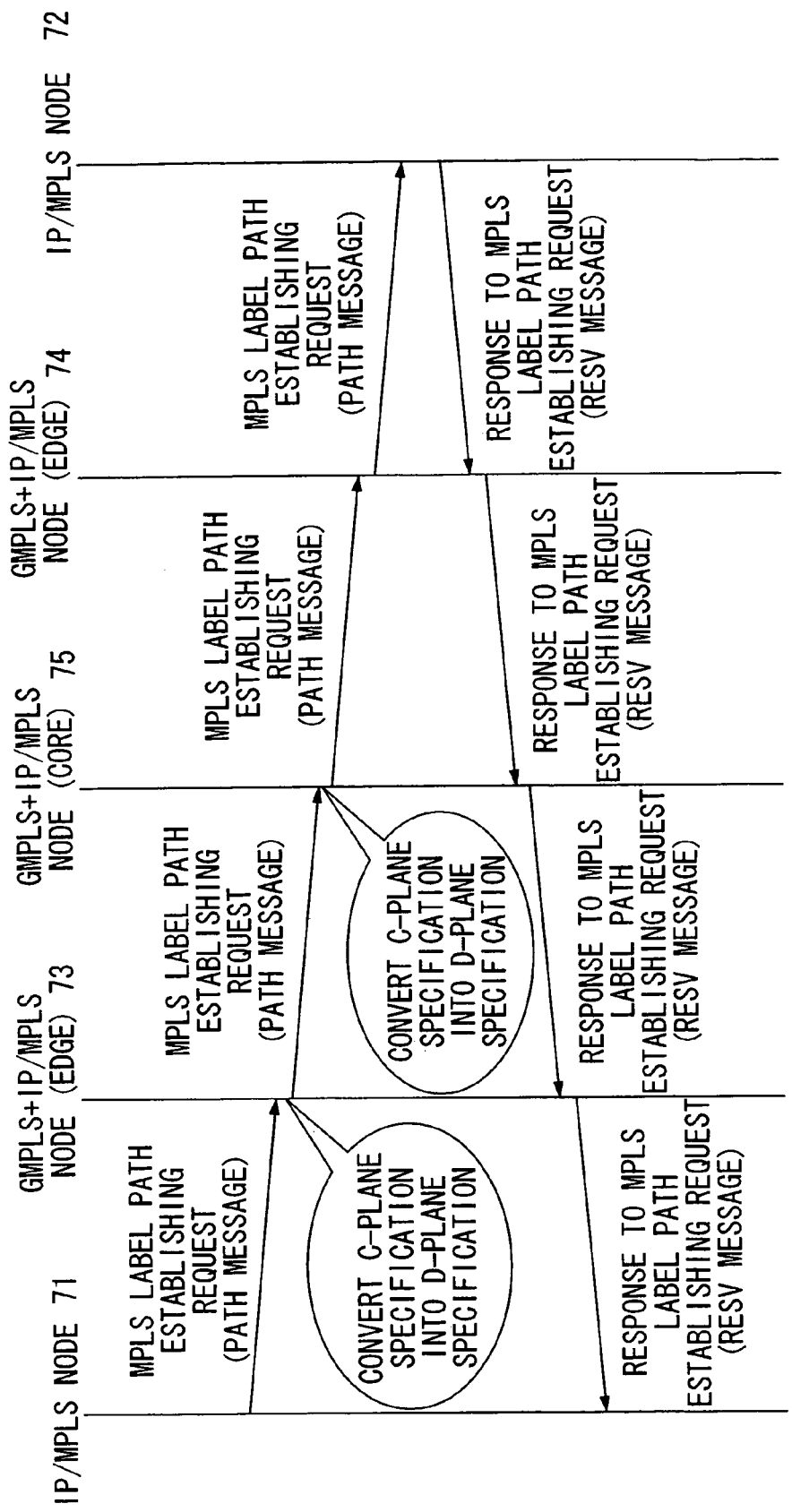
FIG. 19 shows a path establishment sequence of the network of example 10 comprising GMPLS+IP/MPLS nodes.

FIG. 18 is a block diagram showing a structure of the network for explaining the present example. The diagram shows an example wherein the network comprises IP/MPLS nodes 71 and 72, GMPLS+IP/MPLS nodes (edge) 73 and 74, and a GMPLS+IP/MPLS node (core) 75. Moreover, FIG. 19 shows a path establishment sequence of the network of the present example.

In the case where the C-plane topology of the GMPLS network is advertised by the router LSA, the IP/MPLS node receiving this recognizes the C-plane topology of the GMPLS network, and the IP/MPLS node having this topology information outputs the request to specify the C-plane of the GMPLS network and to establish the MPLS label path, then in the case where there is a GMPLS label path having the corresponding nodes on opposite ends of the C-plane link on the route specified by this request, the route specified for this GMPLS label path is allocated.

By installing the above functions, when establishing the MPLS path from the IP/MPLS node outside of the GMPLS network via the GMPLS network, it becomes possible to specify a route inside of the GMPLS network, to establish the path.

Assuming the case where the route specified by the IP/MPLS node 71 is the C-plane link of the GMPLS network, the GMPLS+IP/MPLS node (edge) 73 in the GMPLS network, and the GMPLS+IP/MPLS node (core) 75 on the route, read the C-plane specification to convert into the D-plane link (label path) corresponding to this C-plane, to establish the route.

The C-plane is originally a network for transferring control signals. Therefore this is not necessarily limited to maintaining a band for transferring large volumes of data. Thus, by providing the abovementioned functions, even if the C-plane of the GMPLS network visible from the IP/MPLS node is specified as a route, the present example can allocate an appropriate network for transferring data by automatically switching to the corresponding D-plane on the same route.

The route specified by the IP/MPLS nodes is the C-plane shown by broken lines in the example of FIG. 18. In this case, if the existing GMPLS label path shown by thick lines is established (if the label path for advertising to the IP/MPLS network is already established), the relaying GMPLS+IP/MPLS node (edge) 73 and the GMPLS+IP/MPLS node (core) 75 read it and convert the route into the D-plane label path.

The sequence at this time is shown in FIG. 19. As shown in FIG. 19, if the IP/MPLS node 71 performs the MPLS label path establishment request (PATH message), the GMPLS+IP/MPLS node (edge) 73 reads the C-plane specification to convert into the D-plane specification to establish the route, and the GMPLS+IP/MPLS node (core) 75 performs in a similar way. Then, when the MPLS label path establishment request is serially transferred to the IP/MPLS node 72, the MPLS label path establishment request response (RESV message) is generated by the IP/MPLS node 72 in response to this request, and serially transferred to the IP/MPLS node 71.

Example 11

Figure 20:
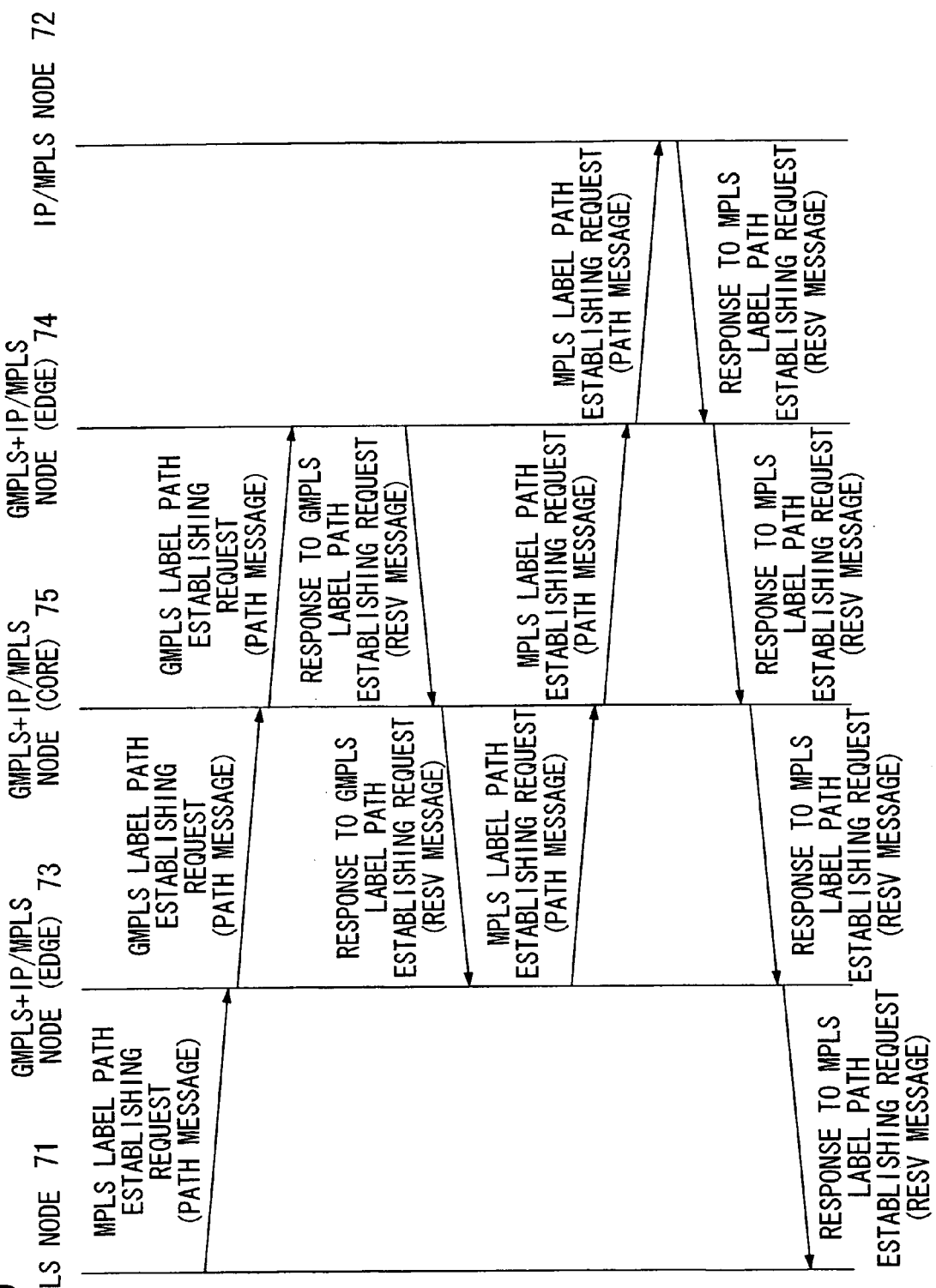
FIG. 20 shows a path establishment sequence of the network of an example 11 comprising GMPLS+IP/MPLS nodes.
Figure 21:
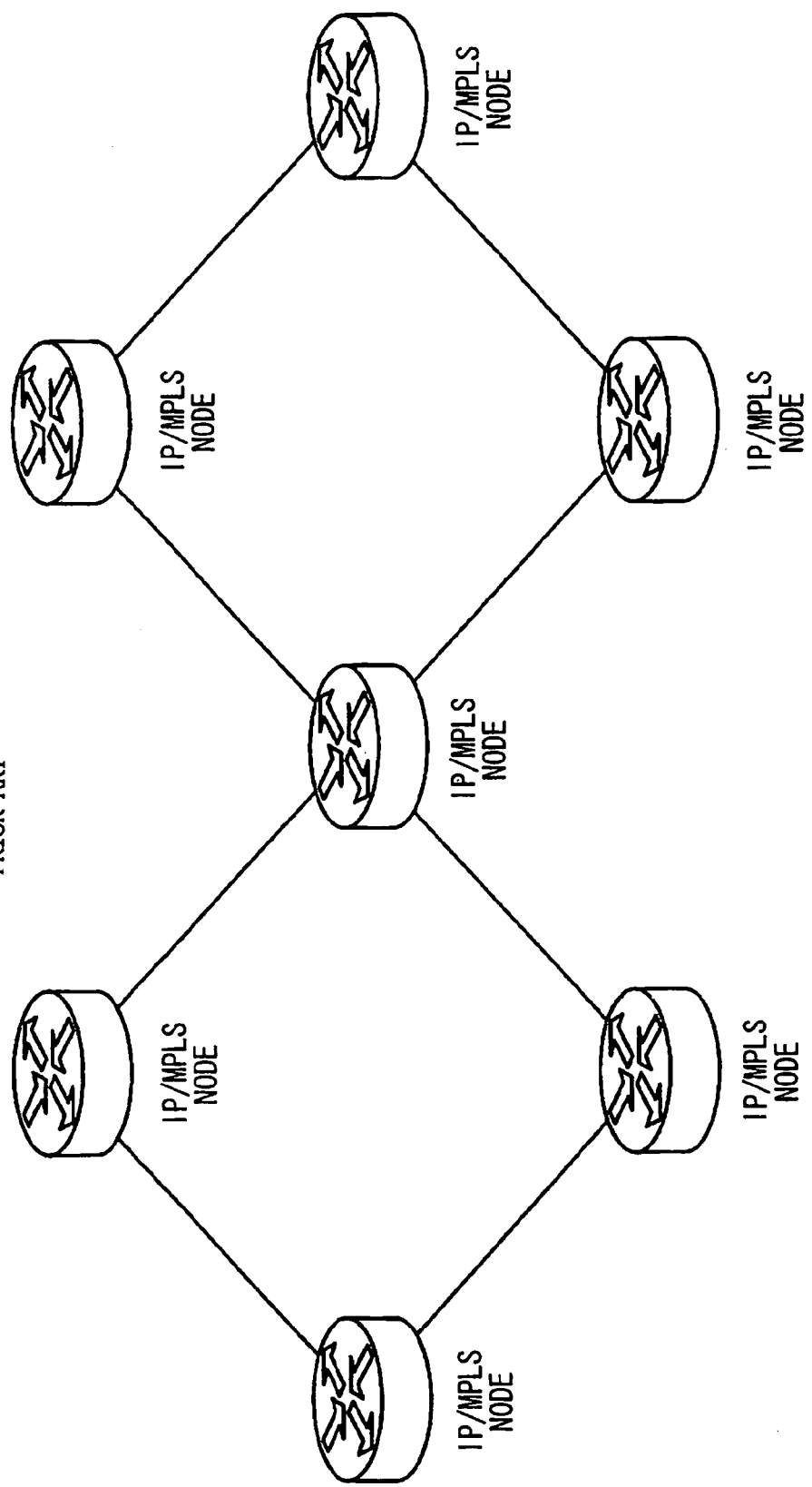
FIG. 21 shows a network comprising IP/MPLS nodes.
Figure 22A:
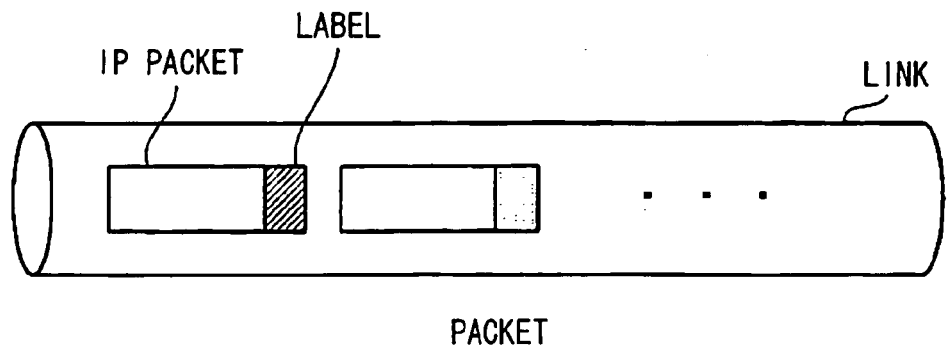
FIG. 22A to FIG. 22D shows the concept of labels.
Figure 22B:
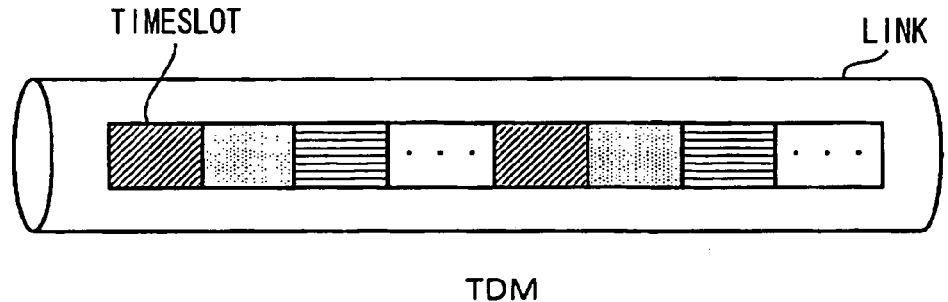
Figure 22C:
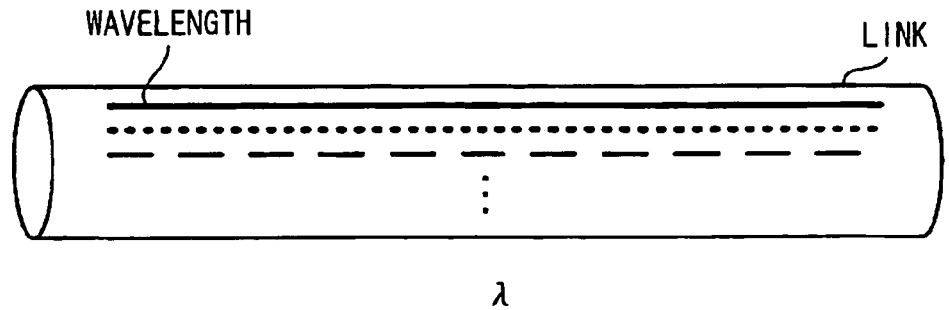
Figure 22D:
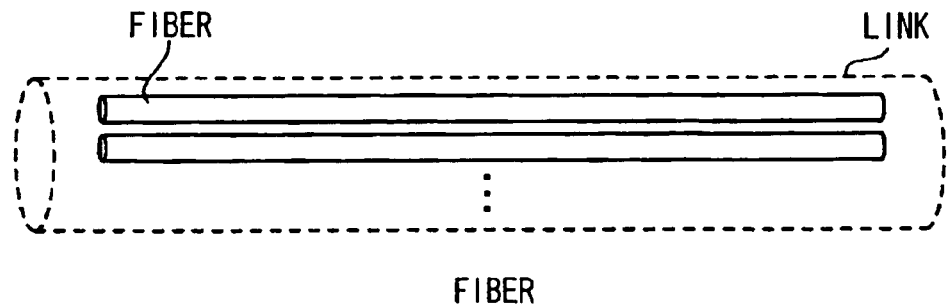
Figure 23:
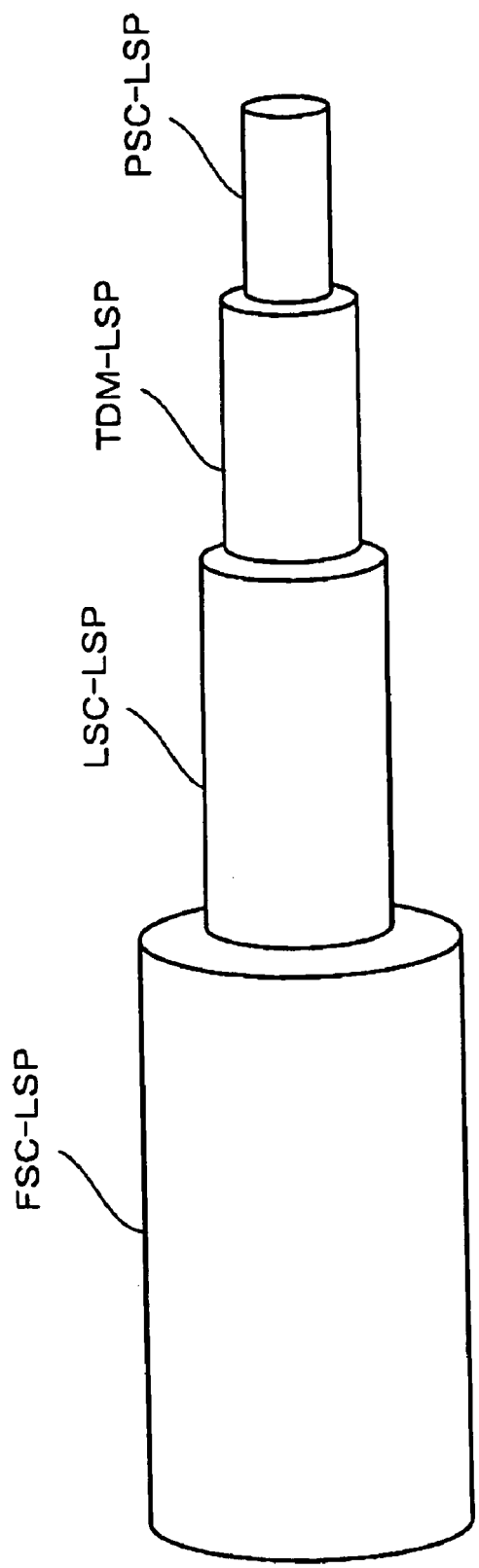
FIG. 23 is an explanatory diagram of LSP hierarchization.
Figure 24:
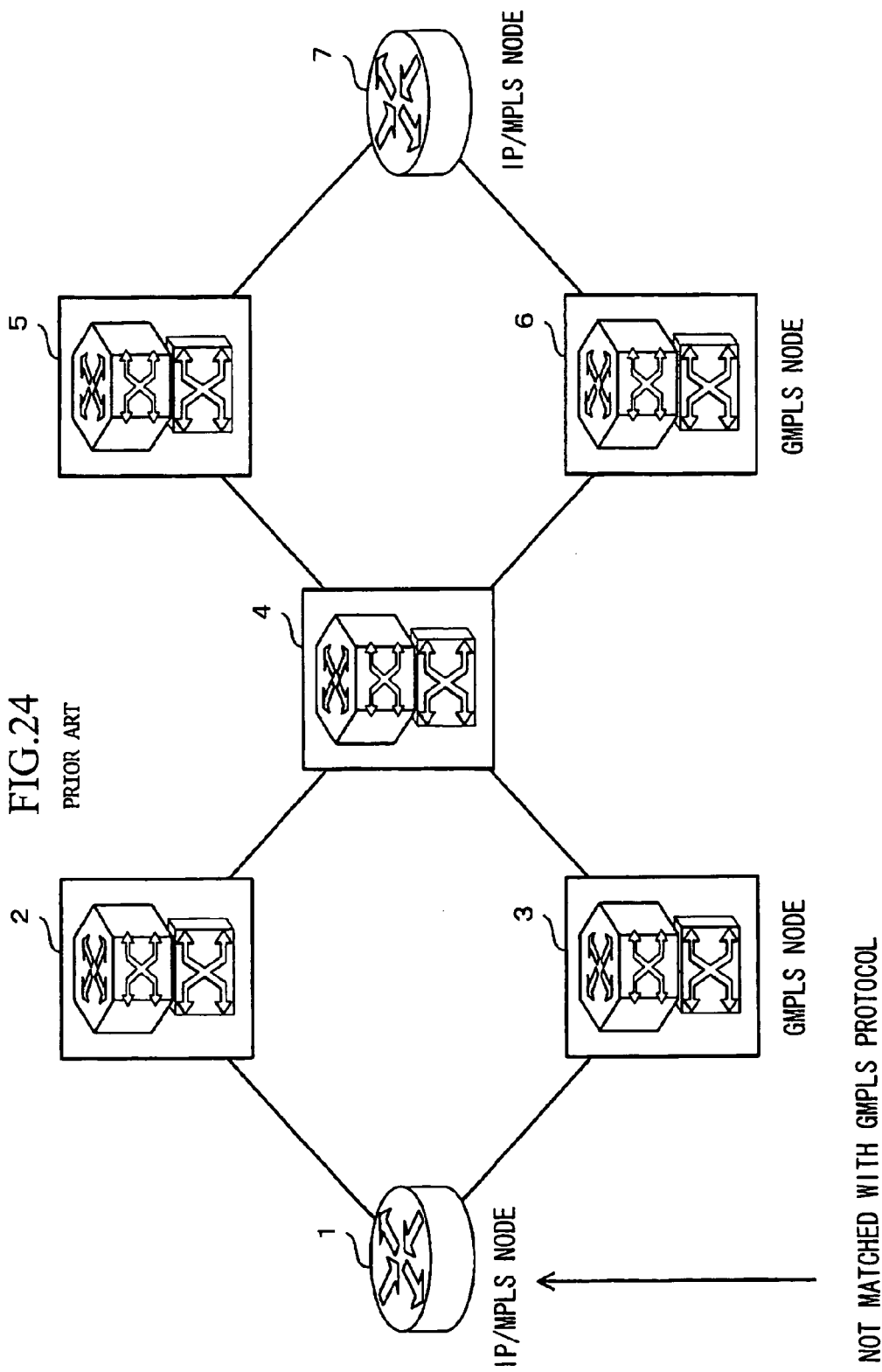
FIG. 24 is an explanatory diagram of the case where GMPLS nodes are inserted in a network comprising IP/MPLS nodes.
Figure 25:
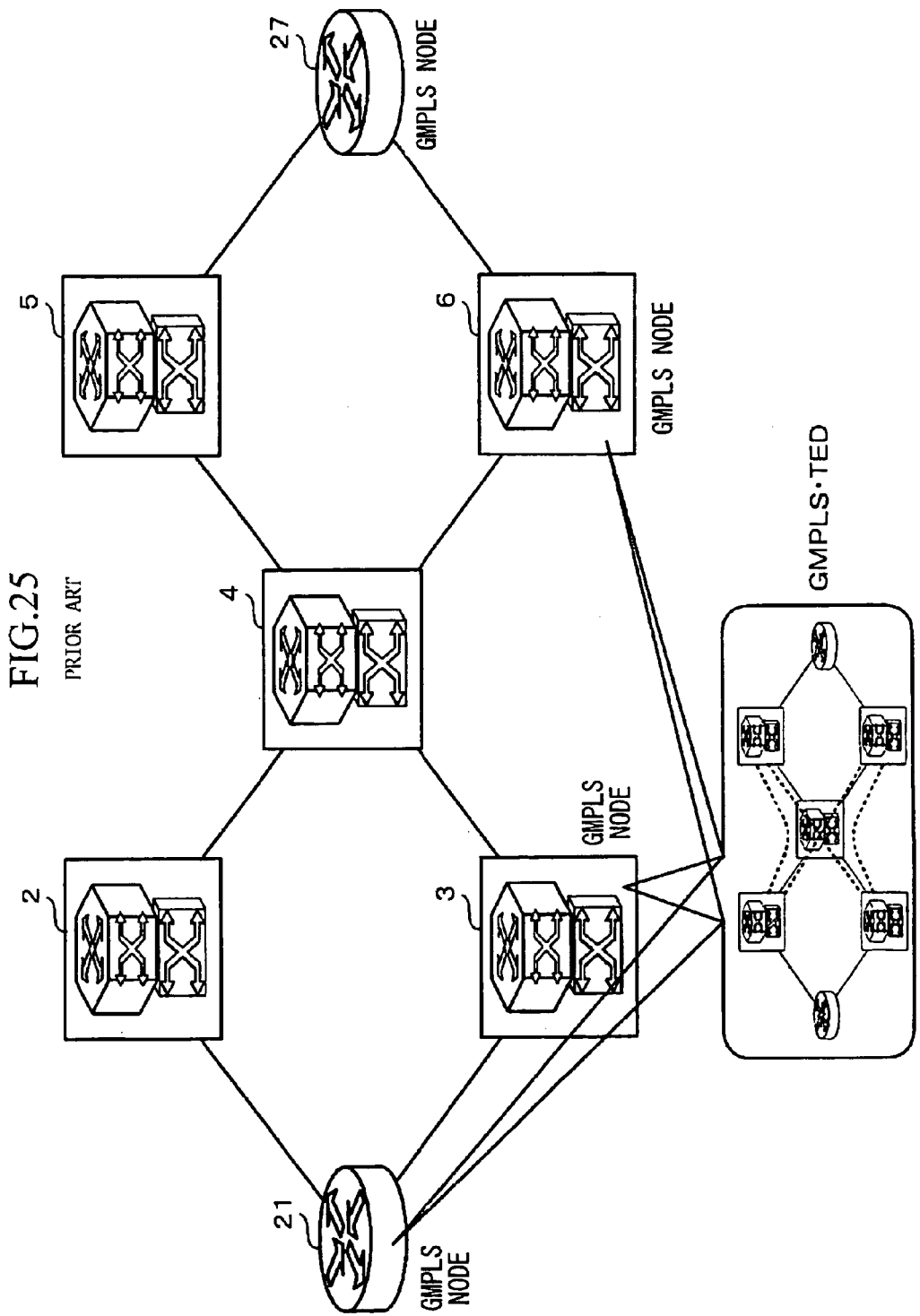
FIG. 25 shows a conventional network comprising GMPLS nodes.
Figure 26A:
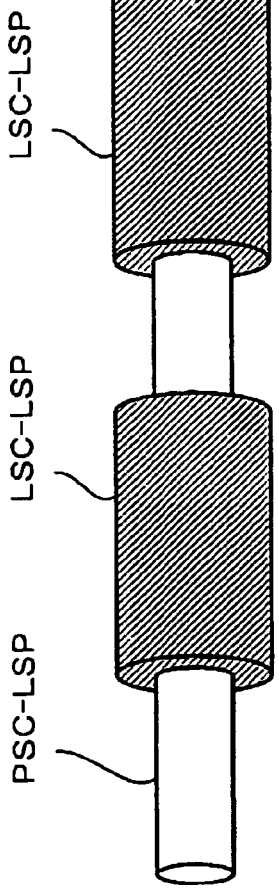
FIG. 26A and FIG. 26B shows LSP hierarchization in the conventional network comprising GMPLS nodes.
Figure 26B:
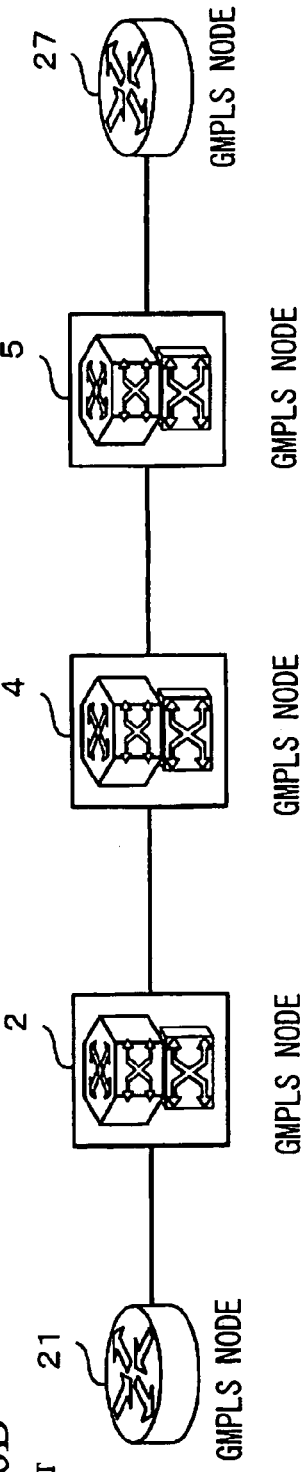
Figure 27:
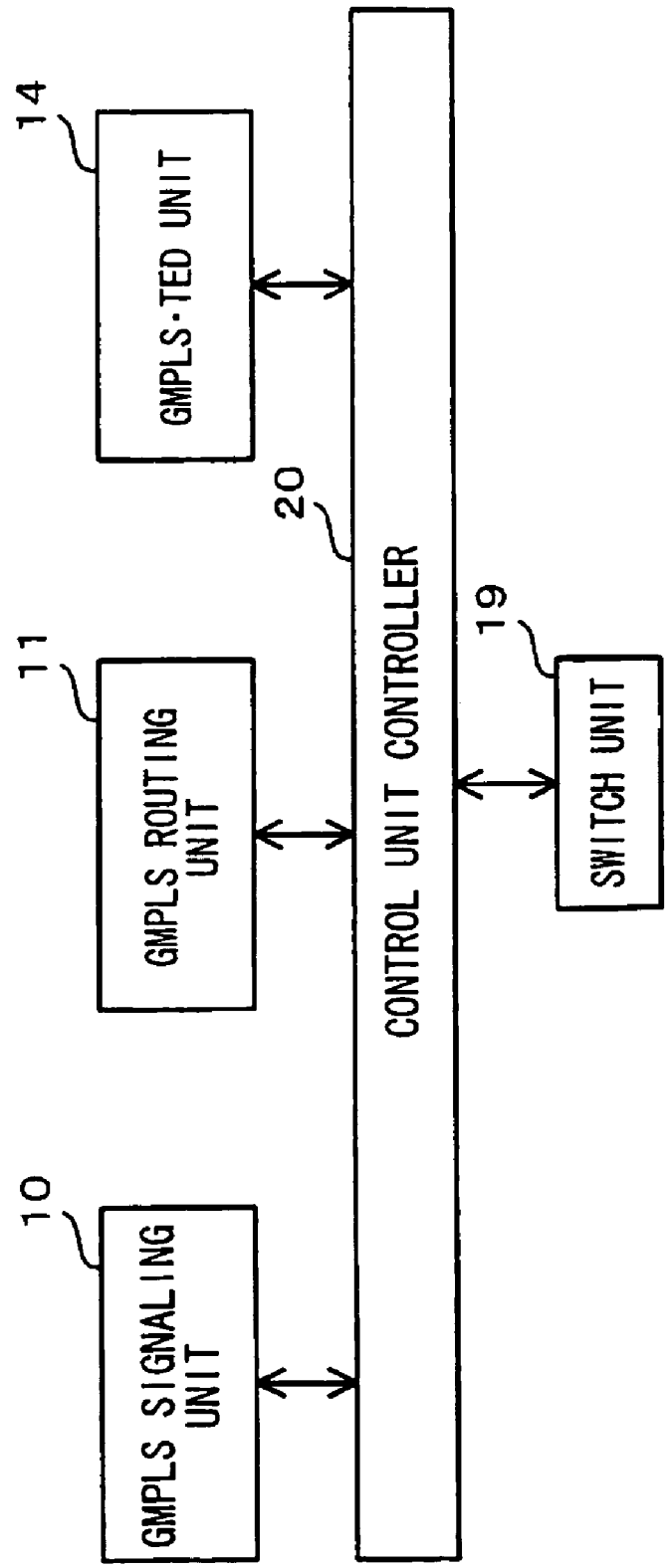
FIG. 27 is a block diagram of a control unit for the conventional GMPLS node.

FIG. 20 shows a path establishment sequence in the present example. The network structure of the present example is the same as that of FIG. 18 referred to in example 10.

Similarly to example 10, in the case where the C-plane topology of the GMPLS network is advertised by the router LSA, the IP/MPLS node receiving this recognizes the C-plane topology of the GMPLS network, and the IP/MPLS node having this topology information outputs the request to specify the C-plane of the GMPLS network and to establish the MPLS label path, then the present example is for the case where there is no GMPLS label path having the corresponding nodes on opposite ends of the C-plane link on the route specified by this request. In this case, the GMPLS+IP/MPLS node of the present example uses the MPLS label path establishment request output from the aforementioned IP/MPLS node as the trigger, so as to newly establish the label path to the D-plane corresponding to the opposite nodes of the C-plane link, and allocates the route specified with respect to the newly established label path.

By installing the above functions, then even in a case where the MPLS node specifies the C-plane of the GMPLS network as the route, and in a case where there is no corresponding label path on the corresponding link, it becomes possible to automatically and newly generate the corresponding label path and establish the MPLS path using the new label path.

FIG. 20 shows the establishment sequence for the MPLS label path at this time. As shown in FIG. 20, the IP/MPLS node 71 outputs the MPLS label path establishment request (PATH message). The GMPLS+IP/MPLS node (edge) 73 receives this MPLS label path establishment request. If the GMPLS+IP/MPLS node (edge) 73 detects that there is no GMPLS label path having the corresponding nodes on opposite ends of the C-plane link on the route specified by the MPLS label path establishment request, the GMPLS+IP/MPLS node (edge) 73 generates the GMPLS label path establishment request (PATH message). This GMPLS label path establishment request is transferred to the GMPLS+IP/MPLS node (edge) 74 via the GMPLS+IP/MPLS node (core) 75. Accordingly, the label path is newly established in the D-plane. In response to this GMPLS label path establishment request, the GMPLS+IP/MPLS node (edge) 74 generates the GMPLS label path establishment request response and this GMPLS label path establishment request response is transferred to the GMPLS+IP/MPLS node (edge) 73. At this time, the respective GMPLS+IP/MPLS nodes allocate the route specified for the newly established label path. Then, similarly to example 10, the MPLS label path establishment request is transferred to the IP/MPLS node 72, and then the MPLS label path establishment request response is transferred to the IP/MPLS node 71.

Example 12

In the present example, in the case where the GMPLS label path having the corresponding nodes on opposite ends of the C-plane link of the GMPLS network specified by the IP/MPLS node is allocated as in the abovementioned example 10 or example 11, the GMPLS+IP/MPLS node which directly receives the request from the IP/MPLS node transfers the data which is transferred from the IP/MPLS node, not to the route specified by the IP/MPLS node, but to the GMPLS label path allocated as described above. That is, in the case where the GMPLS+IP/MPLS node (edge) converts the label path route specifying the C-plane into the D-plane label path, then synchronized with this, the routing table (not shown) of this GMPLS+IP/MPLS node (edge) is rewritten, and transfer to the D-plane label path is performed.

As above, preferred examples of the present invention are described with reference to the drawings. However the present invention is not limited to the example described above and for example, the components of these examples may be suitably combined.

INDUSTRIAL APPLICABILITY

According the present invention, it becomes possible to realize a network having MPLS and IP/MPLS mixed, in which the IP/MPLS node can be operated as is without replacing the IP/MPLS node with a node having a GMPLS function, even if the GMPLS and IP/MPLS are mixed. Accordingly, the applicable range of the node is widened, enabling a decrease in the cost of the node. Moreover, since the number of types of arranged nodes can be decreased, when designing the network, the degree of freedom of design can be improved. Furthermore, according to the present invention, in the case where the GMPLS network and the IP/MPLS network are connected, the routing protocol can be normally operated. Therefore, by performing traffic engineering based on this, it becomes possible to distribute the traffic, and to effectively use the network resources.

The invention claimed is:

1. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:

a device which establishes a GMPLS label path of a packet layer with another GMPLS+IP/MPLS node in the GMPLS network;

a device which tunnel transfers a packet transferred from the IP/MPLS node with the other GMPLS+IP/MPLS node through the GMPLS label path;

a device which advertises link state information of the GMPLS label path of the packet layer to the IP/MPLS node by a router LSA (Label Switching Advertisement) as a normal link in the IP/MPLS node; and a device which converts a link of PSC-LSP (Packet Switch Capability-Label Switch Path) used for IP/MPLS from an unnumbered system into a numbered system to advertise as the link of the numbered system.

2. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:

a device which establishes a GMPLS label path of a packet layer with another GMPLS+IP/MPLS node in the GMPLS network;

a device which tunnel transfers a packet transferred from the IP/MPLS node with the other GMPLS+IP/MPLS node through the GMPLS label path;

a device which advertises link state information of the GMPLS label path of the packet layer to the IP/MPLS node by a router LSA (Label Switching Advertisement) as a normal link in the IP/MPLS node;

a device which performs processing inside of the GMPLS network in accordance with an unnumbered system; and a device which converts a link of PSC-LSP (Packet Switch Capability-Label Switch Path) used for IP/MPLS from the unnumbered system into a numbered system to advertise as the link of the numbered system.

3. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:

a device which establishes a GMPLS label path of a packet layer with another GMPLS+IP/MPLS node in the GMPLS network;

a device which tunnel transfers a packet transferred from the IP/MPLS node with the other GMPLS+IP/MPLS node through the GMPLS label path;

a device which advertises link state information of the GMPLS label path of the packet layer to the IP/MPLS node by a router LSA (Label Switching Advertisement) as a normal link in the IP/MPLS node;

a device which performs processing inside of the GMPLS network in accordance with an unnumbered system; and a device which converts the GMPLS label switch path of the packet layer from the unnumbered system into a numbered system to advertise as the link of the numbered system.

4. A GMPLS+IP/MPLS node according to any one of claims 1, 2, and 3, further comprising:

a device which previously stores an IP address; and a device which uses the stored IP address as an IP address of the link of the numbered system.

5. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:

a device which establishes a GMPLS label path of a packet layer with another GMPLS+IP/MPLS node in the GMPLS network;

a device which tunnel transfers a packet transferred from the IP/MPLS node with the other GMPLS+IP/MPLS node through the GMPLS label path;

a device which advertises link state information of the GMPLS label path of the packet layer to the IP/MPLS node by a router LSA (Label Switching Advertisement) as a normal link in the IP/MPLS node; and an LSA converting device which converts an Opaque LSA expressing a D-plane label path in the GMPLS network into a router LSA, wherein when the label path is a point-to-point Link type of a numbered system, the LSA converting device changes a Link-State Advertisement Type to 1 corresponding to the router LSA, copies an Advertising Router value and an LS Sequence number value, copies a Link ID field value in the Opaque LSA to a Link ID field of the router LSA, and copies a Local interface IP address field value in the Opaque LSA to a Link Data field of the router LSA expressing a router interface's IP address.

6. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:

a device which establishes a GMPLS label path of a packet layer with another GMPLS+IP/MPLS node in the GMPLS network;

a device which tunnel transfers a packet transferred from the IP/MPLS node with the other GMPLS+IP/MPLS node through the GMPLS label path;

a device which advertises link state information of the GMPLS label path of the packet layer to the IP/MPLS node by a router LSA (Label Switching Advertisement) as a normal link in the IP/MPLS node; and an LSA converting device which converts an Opaque LSA expressing a D-plane label path in the GMPLS network into a router LSA, wherein when the label path is a point-to-point Link type of an unnumbered system, the LSA converting device changes a Link-State Advertisement Type to 1 corresponding to the router LSA, copies an Advertising Router value and an LS Sequence number value, copies a Link ID field value in the Opaque LSA to a Link ID field of the router LSA, and copies a Link Local Identifiers field value in the Opaque LSA to a Link Data field of the router LSA expressing an ifIndex value.

7. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:

a device which establishes a GMPLS label path of a packet layer with another GMPLS+IP/MPLS node in the GMPLS network;

a device which tunnel transfers a packet transferred from the IP/MPLS node with the other GMPLS+IP/MPLS node through the GMPLS label path;

a device which advertises link state information of the GMPLS label path of the packet layer to the IP/MPLS node by a router LSA (Label Switching Advertisement) as a normal link in the IP/MPLS node; and an LSA converting device which converts an Opaque LSA expressing a D-plane label path in the GMPLS network into a router LSA, wherein when the label path is a multi-access Link type, the LSA converting device changes a Link-State Advertisement Type to 1 corresponding to the router LSA, copies an Advertising Router value and an LS Sequence number value, copies a Link ID field value in the Opaque LSA to a Link ID field of the router LSA, and copies a Local interface IP address field value in the Opaque LSA to a Link Data field of the router LSA expressing a router interface's IP address.

8. A GMPLS+IP/MPLS node according to any one of claim 5 through claim 7, further comprising:
an LSA identifying device which receives a router LSA generated by another GMPLS+IP/MPLS node and identifies whether the router LSA advertises a C-plane of the GMPLS network, or whether the router LSA is obtained by converting an Opaque LSA expressing the GMPLS label path; and
a link state holding device which holds link state information of the GMPLS network,
wherein the LSA identifying device searches the link state holding device of the GMPLS+IP/MPLS node itself using an Advertising Router value and an LS Sequence number value included in the received router LSA as a key, and when link state information having the same Advertising Router and LS Sequence number as the received router LSA is held in the link state holding device, the LSA identifying device judges that the received router LSA is obtained by converting the Opaque LSA expressing the GMPLS label path.

9. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:
a device which establishes a GMPLS label path of a packet layer with another GMPLS+IP/MPLS node in the GMPLS network;
a device which tunnel transfers a packet transferred from the IP/MPLS node with the other GMPLS+IP/MPLS node through the GMPLS label path;
a device which advertises link state information of the GMPLS label path of the packet layer to the IP/MPLS node by a router LSA (Label Switching Advertisement) as a normal link in the IP/MPLS node; and
an LSA converting device which converts an Opaque LSA expressing a D-plane label path in the GMPLS network into a router LSA,
wherein when the label path is a point-to-point Link type of a numbered system, the LSA converting device changes a Link-State Advertisement Type to 1 corresponding to the router LSA, copies an Advertising Router value, turns on a label path conversion flag which shows that the Opaque LSA expressing the D-plane label path in the GMPLS network is converted into the router LSA, copies a Link ID field value in the Opaque LSA to a Link ID field of the router LSA, and copies a Local interface IP address field value in the Opaque LSA to a Link Data field of the router LSA expressing a router interface's IP address.

10. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:
a device which establishes a GMPLS label path of a packet layer with another GMPLS+IP/MPLS node in the GMPLS network;
a device which tunnel transfers a packet transferred from the IP/MPLS node with the other GMPLS+IP/MPLS node through the GMPLS label path;
a device which advertises link state information of the GMPLS label path of the packet layer to the IP/MPLS node by a router LSA (Label Switching Advertisement) as a normal link in the IP/MPLS node; and
an LSA converting device which converts an Opaque LSA expressing a D-plane label path in the GMPLS network into a router LSA,
wherein when the label path is a point-to-point Link type of an unnumbered system, the LSA converting device changes a Link-State Advertisement Type to 1 corresponding to the router LSA, copies an Advertising Router value, turns on a label path conversion flag which shows that the Opaque LSA expressing the D-plane label path in the GMPLS network is converted into the router LSA, copies a Link ID field value in the Opaque LSA to a Link ID field of the router LSA, and copies a Link Local Identifiers field value in the Opaque LSA to a Link Data field of the router LSA expressing an ifIndex value.

11. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:
a device which establishes a GMPLS label path of a packet layer with another GMPLS+IP/MPLS node in the GMPLS network;
a device which tunnel transfers a packet transferred from the IP/MPLS node with the other GMPLS+IP/MPLS node through the GMPLS label path;
a device which advertises link state information of the GMPLS label path of the packet layer to the IP/MPLS node by a router LSA (Label Switching Advertisement) as a normal link in the IP/MPLS node; and
an LSA converting device which converts an Opaque LSA expressing a D-plane label path in the GMPLS network into a router LSA,
wherein when the label path is a multi-access Link type, the LSA converting device changes a Link-State Advertisement Type to 1 corresponding to the router LSA, copies an Advertising Router value, turns on a label path conversion flag which shows that the Opaque LSA expressing the D-plane label path in the GMPLS network is converted into the router LSA, copies a Link ID field value in the Opaque LSA to a Link ID field of the router LSA, and copies a Local interface IP address field value in the Opaque LSA to a Link Data field of the router LSA expressing a router interface's IP address.

12. A GMPLS+IP/MPLS node according to any one of claim 9 through claim 11, further comprising:
- an LSA identifying device which receives a router LSA generated by another GMPLS+IP/MPLS node and identifies whether the router LSA advertises a C-plane of the GMPLS network, or whether the router LSA is obtained by converting an Opaque LSA expressing the GMPLS label path; and
- a link state holding device which holds link state information of the GMPLS network,
- wherein the LSA identifying device searches the link state holding device of the GMPLS+IP/MPLS node itself using an Advertising Router value and a label path conversion flag included in the received router LSA as a key, and when link state information having the same Advertising Router value as the received router LSA and having the label path conversion flag turned on is held in the link state holding device, the LSA identifying device judges that the received router LSA is obtained by converting the Opaque LSA expressing the GMPLS label path.

13. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:
- a device which establishes a GMPLS label path of a packet layer with another GMPLS+IP/MPLS node in the GMPLS network;
- a device which tunnel transfers a packet transferred from the IP/MPLS node with the other GMPLS+IP/MPLS node through the GMPLS label path;
- a device which advertises link state information of the GMPLS label path of the packet layer to the IP/MPLS node by a router LSA (Label Switching Advertisement) as a normal link in the IP/MPLS node; and
- a device which, when a C-plane topology of the GMPLS network is advertised by the router LSA, an IP/MPLS node receiving the router LSA recognizes the C-plane topology of the GMPLS network, and an IP/MPLS node having information regarding the topology outputs a request to specify the C-plane of the GMPLS network and to establish an MPLS label path, and if there is a GMPLS label path having the corresponding nodes on opposite ends of a C-plane link on a route specified by the request, allocates the specified route to the GMPLS label path.

14. A GMPLS+IP/MPLS node which is used in a network in which a GMPLS (Generalized Multi Protocol Label Switching) network and an IP (Internet Protocol) network are mixed, the GMPLS network comprising a node having a GMPLS function, the IP network comprising an IP/MPLS (Internet Protocol/Multi Protocol Label Switching) node, the GMPLS+IP/MPLS node constituting the GMPLS network, the GMPLS+IP/MPLS node processing a GMPLS protocol and an IP/MPLS protocol, the GMPLS+IP/MPLS node comprising:
- a device which establishes a GMPLS label path of a packet layer with another GMPLS+IP/MPLS node in the GMPLS network;
- a device which tunnel transfers a packet transferred from the IP/MPLS node with the other GMPLS+IP/MPLS node through the GMPLS label path;
- a device which advertises link state information of the GMPLS label path of the packet layer to the IP/MPLS node by a router LSA (Label Switching Advertisement) as a normal link in the IP/MPLS node; and
- a device which, when a C-plane topology of the GMPLS network is advertised by the router LSA, an IP/MPLS node receiving the router LSA recognizes the C-plane topology of the GMPLS network, and an IP/MPLS node having information regarding the topology outputs a request to specify the C-plane of the GMPLS network and to establish an MPLS label path, and if there is no GMPLS label path having the corresponding nodes on opposite ends of a C-plane link on a route specified by the request, in response to an MPLS label path establishment request output from the IP/MPLS node, newly establishes a label path on a D-plane corresponding to opposite nodes of the C-plane link, and allocates the specified route to the newly established label path.

15. A GMPLS+IP/MPLS node according to claim 13 or claim 14, further comprising a device which, when the GMPLS label path having the corresponding nodes on opposite ends of the C-plane link of the GMPLS network specified by the IP/MPLS node is allocated, and if the GMPLS+IP/MPLS node itself directly receives the request from the IP/MPLS node, transfers data which is transferred from the IP/MPLS node, not to the route specified by the IP/MPLS node, but to the allocated GMPLS label path.

16. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:
- a step of providing a GMPLS+IP/MPLS node which is capable of processing a GMPLS protocol and an IP/MPLS protocol and which is directly connected to the IP network among nodes having the GMPLS function constituting the GMPLS network;
- a step of establishing a GMPLS label path of a packet layer with another GMPLS+IP/MPLS node in the GMPLS network by the GMPLS+IP/MPLS node; and
- a step of tunnel transferring a packet transferred from the IP/MPLS node with the other GMPLS+IP/MPLS node through the GMPLS label path,
- wherein link state information of the GMPLS label path of the packet layer is advertised to the IP/MPLS node by a router LSA as a normal link in the IP/MPLS node, and
- wherein a link of PSC-LSP (Packet Switch Capability-Label Switch Path) used for IP/MPLS is converted from an unnumbered system into a numbered system and is advertised as the link of the numbered system.

17. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:
- a step of providing a GMPLS+IP/MPLS node which is capable of processing a GMPLS protocol and an IP/MPLS protocol and which is directly connected to the IP network among nodes having the GMPLS function constituting the GMPLS network;

a step of establishing a GMPLS label path of a packet layer with another GMPLS+IP/MPLS node in the GMPLS network by the GMPLS+IP/MPLS node; and a step of tunnel transferring a packet transferred from the IP/MPLS node with the other GMPLS+IP/MPLS node through the GMPLS label path, wherein link state information of the GMPLS label path of the packet layer is advertised to the IP/MPLS node by a router LSA as a normal link in the IP/MPLS node, and wherein the GMPLS network performs processing in accordance with an unnumbered system, and a link of PSC-LSP (Packet Switch Capability-Label Switch Path) used for IP/MPLS is converted from the unnumbered system into a numbered system and is advertised as the link of the numbered system.

18. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:

a step of providing a GMPLS+IP/MPLS node which is capable of processing a GMPLS protocol and an IP/MPLS protocol and which is directly connected to the IP network among nodes having the GMPLS function constituting the GMPLS network;

a step of establishing a GMPLS label path of a packet layer with another GMPLS+IP/MPLS node in the GMPLS network by the GMPLS+IP/MPLS node; and a step of tunnel transferring a packet transferred from the IP/MPLS node with the other GMPLS+IP/MPLS node through the GMPLS label path, wherein link state information of the GMPLS label path of the packet layer is advertised to the IP/MPLS node by a router LSA as a normal link in the IP/MPLS node, and wherein the GMPLS network performs processing in accordance with an unnumbered system, and the GMPLS label switch path of the packet layer is converted from the unnumbered system into a numbered system, and is advertised as the link of the numbered system.

19. A packet communication method according to any one of claims 16, 17, and 18, wherein an IP address is previously stored, and the stored IP address is used as an IP address of the link of the numbered system.

20. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:

a step of providing a GMPLS+IP/MPLS node which is capable of processing a GMPLS protocol and an IP/MPLS protocol and which is directly connected to the IP network among nodes having the GMPLS function constituting the GMPLS network;

a step of establishing a GMPLS label path of a packet layer with another GMPLS+IP/MPLS node in the GMPLS network by the GMPLS+IP/MPLS node; and a step of tunnel transferring a packet transferred from the IP/MPLS node with the other GMPLS+IP/MPLS node through the GMPLS label path, wherein link state information of the GMPLS label path of the packet layer is advertised to the IP/MPLS node by a router LSA as a normal link in the IP/MPLS node, and wherein in order to convert an Opaque LSA expressing a D-plane label path in the GMPLS network into a router LSA, when the label path is a point-to-point Link type of a numbered system, a Link-State Advertisement Type is changed to 1 corresponding to the router LSA, an Advertising Router value and an LS Sequence number value are copied, a Link ID field value in the Opaque LSA is copied to a Link ID field of the router LSA, and a Local interface IP address field value in the Opaque LSA is copied to a Link Data field of the router LSA expressing a router interface's IP address.

21. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:

a step of providing a GMPLS+IP/MPLS node which is capable of processing a GMPLS protocol and an IP/MPLS protocol and which is directly connected to the IP network among nodes having the GMPLS function constituting the GMPLS network;

a step of establishing a GMPLS label path of a packet layer with another GMPLS+IP/MPLS node in the GMPLS network by the GMPLS+IP/MPLS node; and a step of tunnel transferring a packet transferred from the IP/MPLS node with the other GMPLS+IP/MPLS node through the GMPLS label path, wherein link state information of the GMPLS label path of the packet layer is advertised to the IP/MPLS node by a router LSA as a normal link in the IP/MPLS node, and wherein in order to convert an Opaque LSA expressing a D-plane label path in the GMPLS network into a router LSA, when the label path is a point-to-point Link type of an unnumbered system, a Link-State Advertisement Type is changed to 1 corresponding to the router LSA, an Advertising Router value and an LS Sequence number value are copied, a Link ID field value in the Opaque LSA is copied to a Link ID field of the router LSA, and a Link Local Identifiers field value in the Opaque LSA is copied to a Link Data field of the router LSA expressing an ifIndex value.

22. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:

a step of providing a GMPLS+IP/MPLS node which is capable of processing a GMPLS protocol and an IP/MPLS protocol and which is directly connected to the IP network among nodes having the GMPLS function constituting the GMPLS network;

a step of establishing a GMPLS label path of a packet layer with another GMPLS+IP/MPLS node in the GMPLS network by the GMPLS+IP/MPLS node; and a step of tunnel transferring a packet transferred from the IP/MPLS node with the other GMPLS+IP/MPLS node through the GMPLS label path, wherein link state information of the GMPLS label path of the packet layer is advertised to the IP/MPLS node by a router LSA as a normal link in the IP/MPLS node, and wherein in order to convert an Opaque LSA expressing a D-plane label path in the GMPLS network into a router LSA, when the label path is a multi-access Link type, a Link-State Advertisement Type is changed to 1 corresponding to the router LSA, an Advertising Router value and an LS Sequence number value are copied, a Link ID field value in the Opaque LSA is copied to a Link ID field of the router LSA, and a Local interface IP address field value in the Opaque LSA is copied to a Link Data field of the router LSA expressing a router interface's IP address.

23. A packet communication method according to any one of claim 20 through claim 22, wherein a router LSA generated by another GMPLS+IP/MPLS node is received, and in order to identify whether the router LSA advertises a C-plane of the GMPLS network or whether the router LSA is obtained by converting an Opaque LSA expressing the GMPLS label path, a link state holding device of its own GMPLS+IP/MPLS node which holds link state information of the GMPLS network is searched, using an Advertising Router value and an LS Sequence number value included in the received router LSA as a key, and when link state information having the same Advertising Router and LS Sequence number as the received router LSA is held in the link state holding device, it is judged that the received router LSA is obtained by converting the Opaque LSA expressing the GMPLS label path.

24. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:

a step of providing a GMPLS+IP/MPLS node which is capable of processing a GMPLS protocol and an IP/MPLS protocol and which is directly connected to the IP network among nodes having the GMPLS function constituting the GMPLS network;

a step of establishing a GMPLS label path of a packet layer with another GMPLS+IP/MPLS node in the GMPLS network by the GMPLS+IP/MPLS node; and a step of tunnel transferring a packet transferred from the IP/MPLS node with the other GMPLS+IP/MPLS node through the GMPLS label path, wherein link state information of the GMPLS label path of the packet layer is advertised to the IP/MPLS node by a router LSA as a normal link in the IP/MPLS node, and wherein in order to convert an Opaque LSA expressing a D-plane label path in the GMPLS network into a router LSA, when the label path is a point-to-point Link type of a numbered system, a Link-State Advertisement Type is changed to 1 corresponding to the router LSA, an Advertising Router value is copied, a label path conversion flag which shows that the Opaque LSA expressing the D-plane label path in the GMPLS network is converted into the router LSA is turned on, a Link ID field value in the Opaque LSA is copied to a Link ID field of the router LSA, and a Local interface IP address field value in the Opaque LSA is copied to a Link Data field of the router LSA expressing a router interface's IP address.

25. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:

a step of providing a GMPLS+IP/MPLS node which is capable of processing a GMPLS protocol and an IP/MPLS protocol and which is directly connected to the IP network among nodes having the GMPLS function constituting the GMPLS network;

a step of establishing a GMPLS label path of a packet layer with another GMPLS+IP/MPLS node in the GMPLS network by the GMPLS+IP/MPLS node; and a step of tunnel transferring a packet transferred from the IP/MPLS node with the other GMPLS+IP/MPLS node through the GMPLS label path, wherein link state information of the GMPLS label path of the packet layer is advertised to the IP/MPLS node by a router LSA as a normal link in the IP/MPLS node, and wherein in order to convert an Opaque LSA expressing a D-plane label path in the GMPLS network into a router LSA, when the label path is a point-to-point Link type of an unnumbered system, a Link-State Advertisement Type is changed to 1 corresponding to the router LSA, an Advertising Router value is copied, a label path conversion flag which shows that the Opaque LSA expressing the D-plane label path in the GMPLS network is converted into the router LSA is turned on, a Link ID field value in the Opaque LSA is copied to a Link ID field of the router LSA, and a Link Local Identifiers field value in the Opaque LSA is copied to a Link Data field of the router LSA expressing an ifIndex value.

26. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:

a step of providing a GMPLS+IP/MPLS node which is capable of processing a GMPLS protocol and an IP/MPLS protocol and which is directly connected to the IP network among nodes having the GMPLS function constituting the GMPLS network;

a step of establishing a GMPLS label path of a packet layer with another GMPLS+IP/MPLS node in the GMPLS network by the GMPLS+IP/MPLS node; and a step of tunnel transferring a packet transferred from the IP/MPLS node with the other GMPLS+IP/MPLS node through the GMPLS label path, wherein link state information of the GMPLS label path of the packet layer is advertised to the IP/MPLS node by a router LSA as a normal link in the IP/MPLS node, and wherein in order to convert an Opaque LSA expressing a D-plane label path in the GMPLS network into a router LSA, when the label path is a multi-access Link type, a Link-State Advertisement Type is changed to 1 corresponding to the router LSA, an Advertising Router value is copied, a label path conversion flag which shows that the Opaque LSA expressing the D-plane label path in the GMPLS network is converted into the router LSA is turned on, a Link ID field value in the Opaque LSA is copied to a Link ID field of the router LSA, and a Local interface IP address field value in the Opaque LSA is copied to a Link Data field of the router LSA expressing a router interface's IP address.

27. A packet communication method according to any one of claim 24 through claim 26, wherein a router LSA generated by another GMPLS+IP/MPLS node is received, and in order to identify whether the router LSA advertises a C-plane of the GMPLS network or whether the router is obtained by converting an Opaque LSA expressing the GMPLS label path, a link state holding device of its own GMPLS+IP/MPLS node which holds link state information of the GMPLS network is searched using an Advertising Router value and a label path conversion flag included in the received router LSA as a key, and when link state information having the same Advertising Router value as the received router LSA and having the label path conversion flag turned on is held in the link state holding device, it is judged that the received router LSA is obtained by converting the Opaque LSA expressing the GMPLS label path.

28. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:
   a step of providing a GMPLS+IP/MPLS node which is capable of processing a GMPLS protocol and an IP/MPLS protocol and which is directly connected to the IP network among nodes having the GMPLS function constituting the GMPLS network;
   a step of establishing a GMPLS label path of a packet layer with another GMPLS+IP/MPLS node in the GMPLS network by the GMPLS+IP/MPLS node; and
   a step of tunnel transferring a packet transferred from the IP/MPLS node with the other GMPLS+IP/MPLS node through the GMPLS label path,
   wherein link state information of the GMPLS label path of the packet layer is advertised to the IP/MPLS node by a router LSA as a normal link in the IP/MPLS node, and
   wherein
   the GMPLS+IP/MPLS node advertises a C-plane topology of the GMPLS network by the router LSA,
   an IP/MPLS node receiving the router LSA recognizes the C-plane topology of the GMPLS network,
   an IP/MPLS node having information regarding the topology outputs a request to specify the C-plane of the GMPLS network and to establish an MPLS label path, and
   if there is a GMPLS label path having the corresponding nodes on opposite ends of a C-plane link on a route specified by the request, the GMPLS+IP/MPLS node allocates the specified route to the GMPLS label path.

29. A packet communication method in a network in which a GMPLS network and an IP network are mixed, the GMPLS network comprising a node having a GMPLS function, the IP network comprising an IP/MPLS node, and the IP/MPLS node transfers a packet with the node having the GMPLS function, the packet communication method comprising:
   a step of providing a GMPLS+IP/MPLS node which is capable of processing a GMPLS protocol and an IP/MPLS protocol and which is directly connected to the IP network among nodes having the GMPLS function constituting the GMPLS network;
   a step of establishing a GMPLS label path of a packet layer with another GMPLS+IP/MPLS node in the GMPLS network by the GMPLS+IP/MPLS node; and
   a step of tunnel transferring a packet transferred from the IP/MPLS node with the other GMPLS+IP/MPLS node through the GMPLS label path,
   wherein link state information of the GMPLS label path of the packet layer is advertised to the IP/MPLS node by a router LSA as a normal link in the IP/MPLS node, and
   wherein
   the GMPLS+IP/MPLS node advertises a C-plane topology of the GMPLS network by the router LSA,
   an IP/MPLS node receiving the router LSA recognizes the C-plane topology of the GMPLS network,
   an IP/MPLS node having information regarding the topology outputs a request to specify the C-plane of the GMPLS network and to establish an MPLS label path, and
   if there is no GMPLS label path having the corresponding nodes on opposite ends of a C-plane link on a route specified by the request, in response to an MPLS label path establishment request output from the IP/MPLS node as a trigger, the GMPLS+IP/MPLS node newly establishes a label path on a D-plane corresponding to opposed nodes of the C-plane link, and allocates the specified route to the newly established label path.

30. A packet communication method according to claim 28 or claim 29, wherein when the GMPLS label path having the corresponding nodes on opposite ends of the C-plane link of the GMPLS network specified by the IP/MPLS node is allocated, a GMPLS+IP/MPLS node which directly receives the request from the IP/MPLS node transfers data which is transferred from the IP/MPLS node, not to the route specified by the IP/MPLS node, but to the allocated GMPLS label path.

* * * * *